United States Patent
Kim et al.

(10) Patent No.: US 10,649,896 B2
(45) Date of Patent: May 12, 2020

(54) STORAGE DEVICE AND DATA PROCESSING SYSTEM INCLUDING THE SAME

(71) Applicant: SAMSUNG ELECTRONICS CO., LTD., Suwon-si (KR)

(72) Inventors: Dong Woo Kim, Suwon-si (KR); Byeong Hui Kim, Hwaseong-si (KR); Kyung Ho Kim, Seoul (KR); Seok Hwan Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 129 days.

(21) Appl. No.: 15/803,169

(22) Filed: Nov. 3, 2017

(65) Prior Publication Data

US 2018/0129604 A1    May 10, 2018

Related U.S. Application Data

(63) Continuation-in-part of application No. 15/475,506, filed on Mar. 31, 2017, now Pat. No. 10,528,264.

(30) Foreign Application Priority Data

Nov. 4, 2016   (KR) .................. 10-2016-0146838
Sep. 20, 2017  (KR) .................. 10-2017-0120908

(51) Int. Cl.
   *G06F 12/08*    (2016.01)
   *G06F 12/0804*  (2016.01)
   (Continued)

(52) U.S. Cl.
   CPC .......... *G06F 12/0804* (2013.01); *G06F 1/324* (2013.01); *G06F 1/3212* (2013.01);
   (Continued)

(58) Field of Classification Search
   CPC .............. G06F 3/061; G06F 12/0866; G06F 2212/2146; G06F 3/0619; G06F 3/0679;
   (Continued)

(56) References Cited

U.S. PATENT DOCUMENTS

| | | | |
|---|---|---|---|
| 5,504,907 A | 4/1996 | Stewart et al. | |
| 5,737,744 A * | 4/1998 | Callison | G06F 11/1076 711/114 |

(Continued)

FOREIGN PATENT DOCUMENTS

| | | |
|---|---|---|
| JP | 10-134558 A | 5/1998 |
| JP | 2006-119996 A | 5/2006 |

(Continued)

*Primary Examiner* — Mano Padmanabhan
*Assistant Examiner* — Jean C Edouard
(74) *Attorney, Agent, or Firm* — Sughrue Mion, PLLC

(57) ABSTRACT

A data storage device and a method for operating the data storage device are disclosed. The data storage device may include an interface receiving a command and data from a host, a cache temporarily storing the received data, a memory non-temporarily storing the data stored in the cache, and a controller controlling the memory and the cache based on the command received from the host. The command may include charge rate of a battery supplying a power to the data storage device. The controller may determine whether or not the data storage device is an idle state, and determine an active operation mode of the data storage device based on the charge rate of the battery, when the data storage device is the idle state.

17 Claims, 19 Drawing Sheets

(51) Int. Cl.
  *G06F 12/0866* (2016.01)
  *G06F 1/3234* (2019.01)
  *G06F 1/3212* (2019.01)
  *G06F 1/324* (2019.01)

(52) U.S. Cl.
  CPC .......... *G06F 1/3268* (2013.01); *G06F 1/3275* (2013.01); *G06F 12/0866* (2013.01); *Y02D 10/126* (2018.01); *Y02D 10/154* (2018.01); *Y02D 10/174* (2018.01)

(58) Field of Classification Search
  CPC . G06F 3/065; G06F 3/06; G06F 12/02; G06F 3/0638; G06F 3/0683; G06F 13/1668; G06F 11/1456; G11C 16/0466
  USPC .......................................................... 711/102
  See application file for complete search history.

(56) References Cited

U.S. PATENT DOCUMENTS

| | | | |
|---|---|---|---|
| 7,003,620 | B2 | 2/2006 | Avraham et al. |
| 7,870,338 | B2 | 1/2011 | Iida et al. |
| 8,806,271 | B2 | 8/2014 | Yong et al. |
| 8,847,546 | B2 | 9/2014 | Baarman et al. |
| 9,009,417 | B2 | 4/2015 | Okawa |
| 9,015,503 | B2 | 4/2015 | Chao et al. |
| 9,269,438 | B2 | 2/2016 | Nachimuthu et al. |
| 9,317,212 | B2 | 4/2016 | Huffman et al. |
| 2003/0200382 | A1* | 10/2003 | Wells .................. G06F 1/30 711/106 |
| 2004/0128448 | A1 | 7/2004 | Stark et al. |
| 2005/0075768 | A1* | 4/2005 | Nicholson ............. G06F 1/263 701/31.4 |
| 2007/0033433 | A1* | 2/2007 | Pecone .................. G06F 1/305 714/6.13 |
| 2007/0219671 | A1* | 9/2007 | Sakurai ................ F02D 41/062 700/297 |
| 2008/0104344 | A1* | 5/2008 | Shimozono .......... G06F 11/1441 711/162 |
| 2010/0274953 | A1* | 10/2010 | Lee ......................... G06F 1/266 711/103 |
| 2010/0299565 | A1* | 11/2010 | Muro ................... G06F 11/1004 714/54 |
| 2011/0016260 | A1* | 1/2011 | Lomelino ............. G06F 11/1441 711/103 |
| 2011/0208914 | A1* | 8/2011 | Winokur ............. G06F 11/1441 711/119 |
| 2011/0225345 | A1* | 9/2011 | Inoue .................... G06F 3/0619 711/103 |
| 2011/0302352 | A1* | 12/2011 | Lee ...................... G11C 11/5628 711/102 |
| 2012/0047387 | A1 | 2/2012 | Sakata |
| 2012/0166731 | A1 | 6/2012 | Maciocco et al. |
| 2012/0239852 | A1* | 9/2012 | Calvert ............... G06F 11/1441 711/103 |
| 2013/0009916 | A1* | 1/2013 | Tseng .................. H04N 13/341 345/204 |
| 2013/0082662 | A1* | 4/2013 | Carre .................... H02J 7/0052 320/134 |
| 2015/0026516 | A1 | 1/2015 | Yong et al. |
| 2015/0067379 | A1* | 3/2015 | Tashima ............... G01R 31/392 713/340 |
| 2015/0268711 | A1 | 9/2015 | Ramani et al. |
| 2016/0085674 | A1 | 3/2016 | Sterns et al. |
| 2016/0266979 | A1* | 9/2016 | Glover ................ G06F 9/30083 |

FOREIGN PATENT DOCUMENTS

| | | |
|---|---|---|
| JP | 2013-182283 A | 9/2013 |
| JP | 5338905 B2 | 11/2013 |
| KR | 10-2007-0005065 A | 1/2007 |
| KR | 10-0777443 B1 | 11/2007 |
| KR | 10-1506675 B1 | 3/2015 |
| KR | 10-1636634 B1 | 7/2016 |
| WO | 2010/137164 A1 | 12/2010 |
| WO | 2013/095437 A1 | 6/2013 |

* cited by examiner

STORAGE DEVICE AND DATA PROCESSING SYSTEM INCLUDING THE SAME

CROSS-REFERENCE TO RELATED APPLICATIONS

This application claims priority from Korean Patent Application No. 10-2017-0120908, filed on Sep. 20, 2017, in the Korean Intellectual Property Office, and is a continuation-in-part of and claims priority to co-pending U.S. patent application Ser. No. 15/475,506, entitled "Storage device and data processing system including the same," filed in the U.S. Patent and Trademark Office on Mar. 31, 2017, which claims priority from Korean Patent Application No. 10-2016-0146838, filed on Nov. 4, 2016, in the Korean Intellectual Property Office, the disclosures of which are incorporated herein by reference in their entireties.

BACKGROUND

1. Field

Apparatuses and methods consistent with exemplary embodiments relate to a data storage device and a data processing system including the same.

2. Description of the Related Art

Recently, non-volatile memory-based storage devices have become increasingly popular among consumers. For example, MP3 players, digital cameras, mobile phones, camcorders, flash cards, solid-state drives (SSD), and the like have increasingly adopted non-volatile memory as storage.

As the number of devices using non-volatile memory as storage has increased, the capacity of non-volatile memory has also risen rapidly. One of the methods of increasing memory capacity is a multi-level cell (MLC) method in which a plurality of bits are stored in one memory cell.

For example, in the case of a multi-level cell (MLC) in which multi-bit data is stored in one memory cell, the least significant bit (LSB) and the most significant bit (MSB), that is, two kinds of bit data may be programmed in one memory cell.

Thus, in the process of programming the MSB in a memory cell where the LSB is also programmed, errors may occur due to an unexpected program fail. In order to prevent the occurrence of errors and ensure the integrity of a data storage device, a sudden power off recovery (SPOR) method of performing the backup of the LSB or periodically synchronizing the data temporarily stored in a cache may be used. For example, in order to synchronize data, a flush operation or a force unit access (FUA) operation may be used.

Meanwhile, a data storage device may perform hibernation to operate in a sleep mode, so as to perform power management.

SUMMARY

Disclosed is a data storage device, which can improve performance and lifetime by determining whether or not performing an LSB backup operation or synchronization operation, that is, whether or not performing an SPOR operation, based on battery information including information about whether or not a battery is detachable, and a data processing system including the data storage device.

Disclosed is a data storage device, which can improve performance and lifetime by determining an operation mode when the data storage device performs input and output commands from a host, based on battery information including information about battery charge rate, and a data processing system including the data storage device.

Disclosed is a data storage device, which can improve performance and lifetime by determining whether or not the data storage device performs a synchronization command from a host, based on battery information including a battery charge rate and a battery charging state information.

According to an aspect of an exemplary embodiment, a data storage device, comprising: an interface receiving a command and data from a host; a cache temporarily storing the received data; a memory non-temporarily storing the data stored in the cache; and a controller controlling the memory and the cache based on the command received from the host, wherein the command includes charge rate of a battery supplying a power to the data storage device, and the controller determines whether or not the data storage device is an idle state, and determines an active operation mode of the data storage device based on the received charge rate of the battery, when the data storage device is the idle state. a data storage device According to an aspect of an exemplary embodiment, a data storage device, comprising: an interface receiving a command and data from a host; a cache temporarily storing the received data; a memory non-temporarily storing the data stored in the cache; and a controller controlling the memory and the cache based on the command received from the host, wherein the command includes charge rate and charging state information of a battery supplying a power to the data storage device, and the controller determines whether or not performing a synchronization operation based on the received charge rate and charging state information of the battery, when receiving a synchronization command from the host.

According to an aspect of an exemplary embodiment, a method of manufacturing a data storage device, comprising: providing a data storage device including an interface externally receiving a command and data, a cache temporarily storing the received data, a memory non-temporarily storing the data stored in the cache, and a controller controlling the memory and the cache based on the command; and testing the data storage device, wherein the command includes the charge rate and charging state information of a battery supplying a power to the data storage device, and the testing the data storage device include testing whether or not the controller included in the data storage device determines an active operation mode of the data storage device based on the charge rate and charging state information of the battery, and whether or not the data storage device performs a synchronization operation.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

BRIEF DESCRIPTION OF THE DRAWINGS

The above and other aspects and features of the present disclosure will become more apparent by describing in detail various exemplary embodiments thereof with reference to the attached drawings, in which.

DETAILED DESCRIPTION OF THE EMBODIMENTS

Hereinafter, a data storage device and a data processing system including the same according to various exemplary embodiments will be described in detail with reference to FIGS. 1 to 11.

Figure 1:
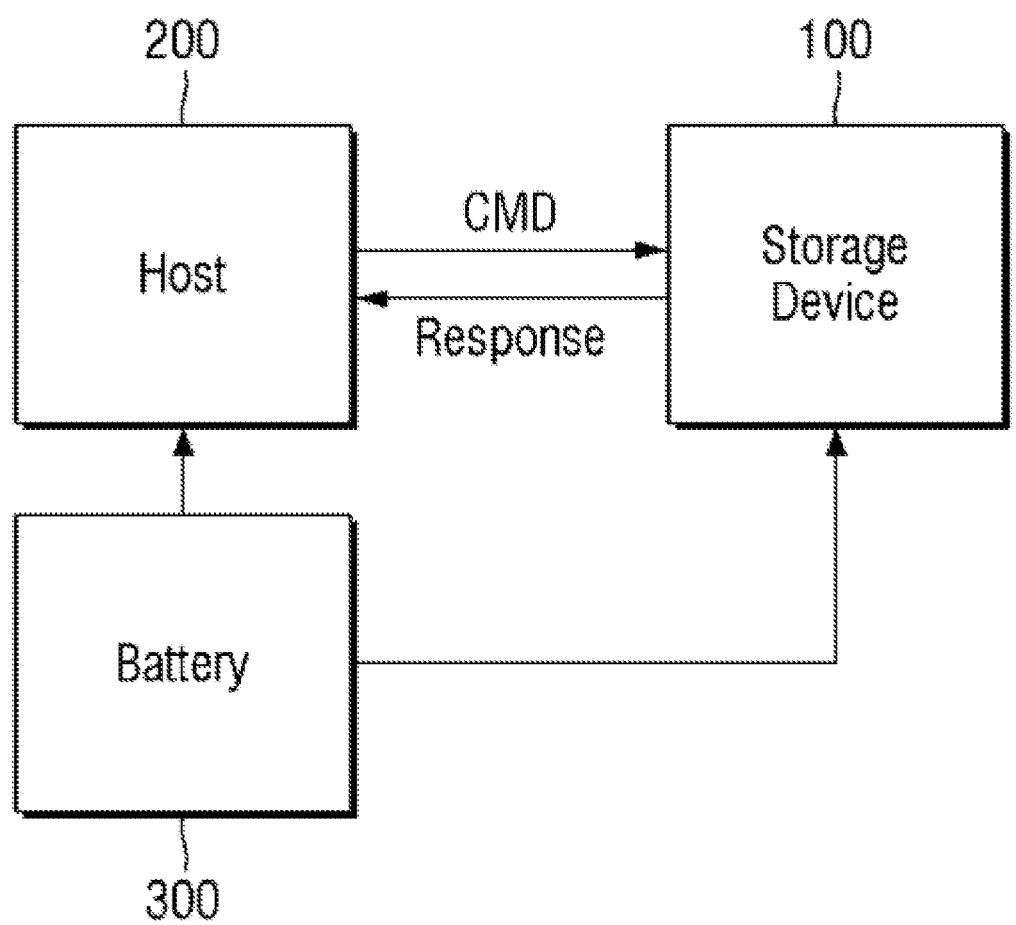
FIG. 1 is a block diagram for illustrating a data processing system according to an exemplary embodiment.

FIG. 1 is a block diagram for illustrating a data processing system according to an exemplary embodiment.

As shown in FIG. 1, the data processing system may include a data storage device 100, a host 200, and a battery 300. Here, each component may constitute a separate chip, module, or device, and may also be included in one device. For example, the data storage device 100 may be connected to the host 200 and then used. However, the present disclosure is not limited thereto, and the data storage device 100 and the host 200 may be integrated into one device.

The host 200 may send a request such as read or write command to the data storage device 100 using an application or a file system. For example, the host 200 may transfer a command CMD for instructing the performance of a write operation or a synchronization operation to the data storage device 100. The data storage device 100 may transfer to the host 200 a response message in response to the request (e.g., write command or synchronization command) included in the command.

The data storage device 100 may control an internal operation (e.g., a read or write operation, a synchronization operation, or the like) according to the request from the host 200.

The data storage device 100 may include a non-volatile memory device. For example, the data storage device 100 may include a PC card (also known as Personal Computer Memory Card International Association or PCMCIA), a compact flash card (CFC), a smart media card (SMC), a memory stick, a multimedia card (MMC, RS-MMC, MMC-micro), an SD card (SD, miniSD, microSD, SDHC), an universal flash memory device (UFS), an embedded multimedia card (Emmc), and the like. However, the present disclosure is not limited thereto.

The battery 300 may supply power to the components included in the data processing system. That is, the battery 300 may supply power to the data storage device 100 and the host 200. The battery 300 may be a detachable battery configured to be detached from the data processing system, or a fixed battery that is not detachable from the data processing system.

The battery has a detachable or fixed attribute in the data processing system. That is, when the battery 300 can be physically separated from the data processing system, the battery is considered a detachable battery. Conversely, when the battery 300 cannot be physically separated from the data processing system, the battery is considered a fixed battery.

When the battery 300 is a detachable battery, the power supplied to the data storage device 100 and the host 200 may be interrupted in an unexpected situation. In order to prepare for this case, the data storage device 100 may perform a sudden power off recovery (SPOR) operation. The SPOR operation will be described in detail later.

However, when the battery 300 is a fixed battery, the power supplied to the data storage device 100 and the host 200 is rarely interrupted unexpectedly. In this case, the data storage device 100 need not perform the SPOR operation. When the data storage device 100 does not perform the SPOR operation, the resource of the data processing system, necessary for performing the SPOR operation, is saved, so as to improve the performance and lifetime of the data processing system.

The host 200 may transfer information about the battery 300, that is, battery information to the data storage device 100. The battery information may include a detachability attribute of the battery 300, a charge rate of the battery 300, a charging operation state attribute of the battery 300, and the like. The detachability attribute of the battery 300 is information indicating whether the battery 300 is detachable or fixed, and the charge rate of the battery 300 is information indicating what percentage of the battery 300 is charged. In addition, the charging operation state attribute of the battery 300 may indicate whether the battery 300 is currently charging or not. Details thereof will be described later with reference to FIGS. 3 to 9.

Further, the host 200 may transfer a data protection attribute to the data storage device 100. Details thereof will be described later with reference to FIG. 5. According to an aspect of an exemplary embodiment, the data protection attribute transferred from the host 200 to the data storage device 100 may be included in the above-described battery information, or may be transferred separately from the battery information.

The host 200 may transfer the battery information and the data protection attribute to the data storage device 100 using a query request protocol, but the scope of the present disclosure is not limited thereto.

Figure 2:
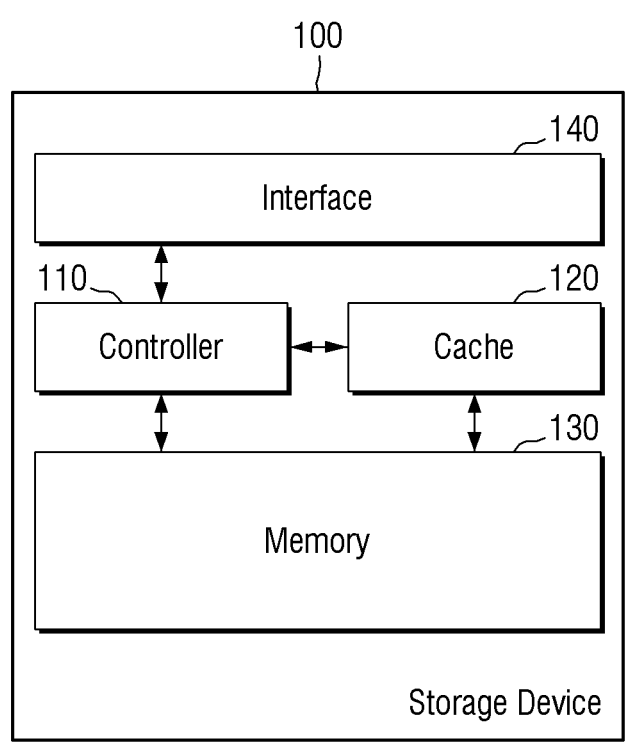
FIG. 2 is a block diagram for illustrating a data storage device according to an exemplary embodiment.

FIG. 2 is a block diagram for illustrating a data storage device according to an exemplary embodiment.

As shown in FIG. 2, the data storage device 100 may include a controller 110, a cache 120, a memory 130, and an interface 140.

The controller 110 may control the cache 120, the memory 130, and the interface 140. The controller 110 may execute commands and perform data exchanges between the host 200 and the memory 130 and between the host 200 and the cache 120 through the interface 140. Further, the controller 110 may include at least one processor. The processor included in the controller 110 may be a micro-processor, but is not limited thereto.

The cache 120 may temporarily store the data received from the host 200. The cache 120 may include high-speed volatile memory or non-volatile memory. For example, the cache 120 may be SRAM or single level cell (SLC) area of flash memory, but the present disclosure is not limited thereto.

The cache 120 may load firmware (F/W), and may provide the firmware (F/W) to the controller 110 when the controller 110 calls for it. The firmware (F/W) may include various commands necessary for the operation of the controller 110. The commands may consist of machine language (e.g., assembly language), and firmware code (F/W code) for performing a specific operation may be created by the combination thereof. However, the present disclosure is not limited thereto.

The memory 130 may store the data received from the host 200. The memory 130 may include a non-volatile memory. For example, the memory 130 may be a flash memory including NAND flash. The flash memory may include SLC and MLC areas. However, the present disclosure is not limited thereto.

The interface 140 may be operable with a protocol for performing the data exchange between the host 200 and the controller 110. For example, the interface 140 may be configured to communicate with the host 200 through at least one of various communications protocols, such as Universal Serial Bus (USB), multimedia card (MMC), peripheral component interconnection (PCI), PCI-express (PCI-E), Advanced Technology Attachment (ATA), Serial-ATA (SATA), Parallel-ATA (PATA), Small Computer Small Interface (SCSI), Enhanced Small Disk Interface (ESDI), Integrated Drive Electronics (IDE), NVMe (Nonvolatile Memory Express) and Query Request protocol. Further, the interface 140 may include at least one processor. The processor included in the interface 140 may be a micro-processor, but is not limited thereto.

The data storage device 100 may further include a data bus through which the controller 110, the cache 120, the memory 130, and the interface can exchange data with each other. The data bus corresponds to a path through which data is transmitted, and may be operable with a protocol for performing data exchange.

The data storage device 100 of the present disclosure may perform an SPOR operation in order to ensure the integrity of the data received from the host 200. The SPOR operation includes a backup operation or a synchronization operation.

Specifically, when the data storage device 100 receives a write command (Write CMD) for the data received from the host 200, the data storage device 100 may perform a backup operation for recording the received data in the memory 130.

In this case, in order to prepare for an unexpected situation (e.g., interruption of power supply) while recording the received data, the data storage device 100 may perform a backup operation for storing a part of the data in the cache 120 operating at high speed or the high-speed area of the memory 130.

More specifically, the data received from the host 200 may include the LSB and the MSB. The controller 110 may temporarily store the LSB in the cache 120 or the high-speed area (e.g., SLC area) of the memory in order to prepare for an unexpected situation during a write command (Write CMD) for recording the received data.

Further, when the data storage device 100 receives a synchronization command (Sync CMD) for the data received from the host 200, the data storage device 100 may perform a synchronization operation for transmitting the data stored in the cache 120 to the memory 130.

Through such an SPOR operation, the data storage device 100 and the data processing system including the same can ensure the integrity of data. However, as a trade-off thereto, excessive use of the cache 120 and the memory 130 may cause deterioration in performance and lifetime.

Thus, the controller 110 may determine whether or not to perform the SPOR operation depending on the detachability attribute of the battery 300.

If the detachability attribute of the battery 300 is a fixed type, the data processing system may not perform the SPOR operation. In this case, the resource of the data processing system, which may be necessary for performing the SPOR operation, can be saved, so as to improve the performance of the entire data processing system and increase the lifetime of the data storage device.

Hereinafter, the operations of the data storage device and the data processing system including the same will be described with regard to the detachability attribute of the battery 300.

Figure 3:
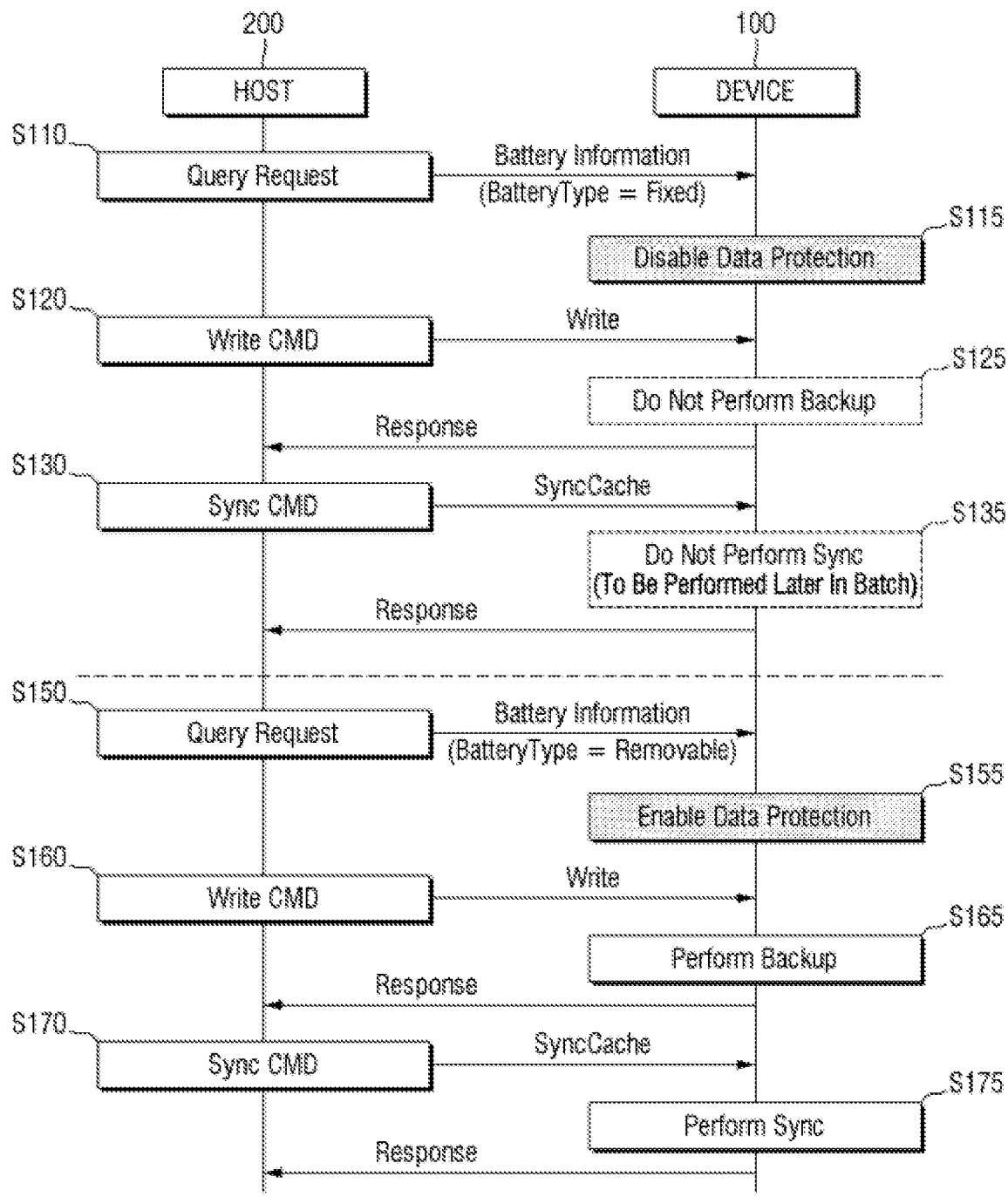
FIG. 3 is a flowchart for illustrating the operation of a data processing system according to an exemplary embodiment.

FIG. 3 is a flowchart for illustrating the operation of a data processing system according to an exemplary embodiment.

As shown in FIG. 3, when the detachability attribute of the battery 300 is a fixed type, the data processing system may disable a data protection function. Conversely, when the detachability attribute of the battery 30 is a detachable type, the data processing system may enable a data protection function.

Specifically, the host 200 of the data processing system may transfer the battery information including the detachability attribute of the battery 300 to the data storage device 100 (S110). In this case, the detachability attribute of the battery 300 is a fixed type. The host 200 may transfer the battery information including the detachability attribute of the battery 300 to the data storage device 100 using a query request protocol.

Subsequently, the data storage device 100 may receive the battery information including the detachability attribute of the battery 300 from the host 200, and then disable a data protection function, that is, an SPOR operation (protection disable) (S115).

Subsequently, the host 200 may transfer a data write command (Write CMD) to the data storage device 100 (S120).

Thus, since the data storage device 100 is in a state in which the SPOR operation is disabled, the data storage device 100 may only transfer a response signal to indicate work completion to the host 200 without performing a backup operation (S125).

Subsequently, the host 200 may transfer a synchronization command (Sync CMD) to the data storage device 100 (S130).

Again, since the data storage device 100 is in a state in which the SPOR operation is disabled, the data storage device 100 may only transfer a response signal to indicate work completion to the host 200 without performing a synchronization operation for transmitting the data stored in the cache 120 (S135). In this case, the data storage device 100 may perform the synchronization operation once a predetermined amount of data is stored in the cache 120, instead of performing the synchronization operation immediately after the synchronization command (Sync CMD) is received.

In the data processing system, the host 200 may transfer the battery information including the detachability attribute of the battery 300 to the data storage device 100 (S150). In this case, the detachability attribute of the battery 300 is a detachable type. The host 200 may transfer the battery information including the detachability attribute of the battery 300 to the data storage device 100 using a query request protocol.

Subsequently, the data storage device 100 may receive the battery information including the detachability attribute of the battery 300 from the host 200, and then enable a data protection function, that is, an SPOR operation (protection enable) (S155).

Subsequently, the host 200 may transfer a data write command (Write CMD) to the data storage device 100 (S160).

Thus, since the data storage device 100 is in a state in which the SPOR operation is enabled, the data storage device 100 may perform a backup operation. Specifically, the data storage device 100 may perform an LSB backup operation for storing the LSB of the LSM and MSB included in the received data in the cache 120 or the high-speed area (e.g., SLC) of the memory 130. However, the present disclosure is not limited thereto. After the completion of the backup operation, the data storage device 100 may transfer a response signal to indicate work completion to the host 200 (S165).

Subsequently, the host 200 may transfer a synchronization command (Sync CMD) to the data storage device 100 (S170).

Since the data storage device 100 is in a state in which the SPOR operation is enabled, the data storage device 100 may perform a synchronization operation for transmitting the data stored in the cache 120 to the memory 130. After the completion of the synchronization operation, the data storage device 100 may transfer a response signal to indicate work completion to the host 200 (S175).

That is, when the detachability attribute of the battery 300 is a fixed type, the SPOR operation is not performed, thereby improving the performance of the system and the lifetime of the data storage device. The order in which the various commands are transmitted from the host 200 to the data storage device 100 may be different from what is shown in FIG. 3 and other figures. For example, the host 200 may send battery information indicating a detachable battery type to the data storage device 100 thereby enabling the data protection function, and then send battery information indicating a fixed battery type thereby disabling the data protection function. Similarly, the host 200 may send the Sync CMD to the data storage device 100 first, and then send the Write CMD to the data storage device 100.

Figure 4:
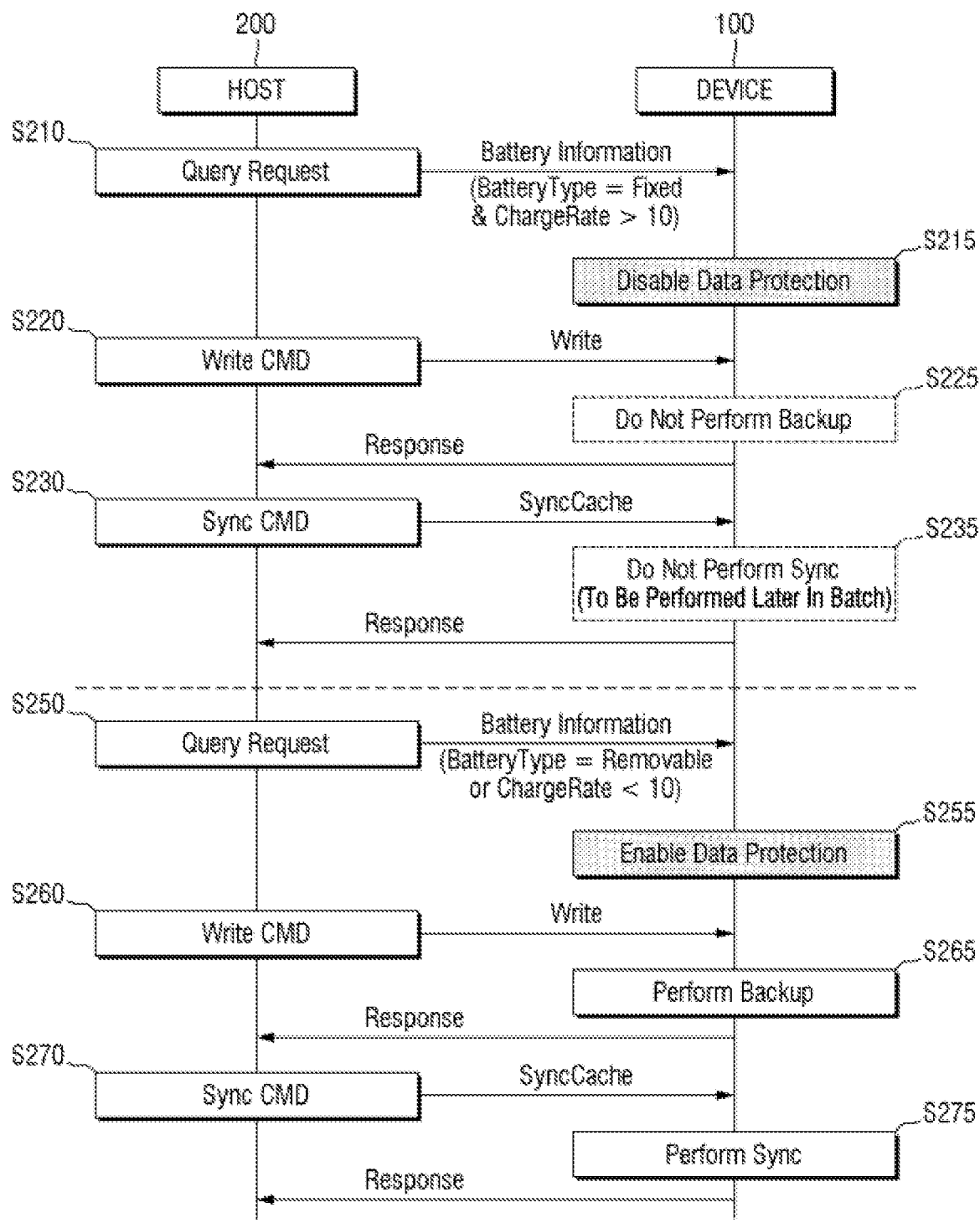
FIG. 4 is a flowchart for illustrating the operation of a data processing system according to an exemplary embodiment.

FIG. 4 is a flowchart for illustrating the operation of a data processing system according to an exemplary embodiment. For the convenience of explanation, hereinafter, the similar descriptions as those in the above-described exemplary embodiment will not be replicated, and differences will be mainly described.

As shown in FIG. 4, the data storage device 100 may receive the battery information including the detachability attribute of the battery 300 and the charge rate of the battery 300 from the host 200. The charge rate of the battery 300 indicates how much of the battery 300 is charged in percentage.

When the detachability attribute of the battery 300 is a fixed type and the charge rate of the battery 300 is higher than a threshold charge rate (e.g., 10%), the data processing system may disable a data protection function. Conversely, when the detachability attribute of the battery 300 is a detachable type or the charge rate of the battery 300 is lower than the threshold charge rate (e.g., 10%), the data processing system may enable a data protection function.

In another example, the detachability attribute of the battery 300 may be a fixed type and the charge rate of the battery 300 may be higher than the threshold charge rate (e.g., 10%). In this case, the host 200 may transfer the battery information including the detachability attribute of the battery 300 and the charge rate of the battery 300 to the data storage device 100 (S210).

Subsequently, the data storage device 100 may receive the battery information including the detachability attribute of the battery 300 and the charge rate of the battery 300 from the host 200, and then determine whether to perform a data protection function, that is, an SPOR operation (S215). In this case, since the detachability attribute of the battery 300 is a fixed type and the charge rate of the battery 300 is higher than the threshold charge rate (e.g., 10%), the SPOR operation may be disabled (Protection Disable).

Subsequently, the host 200 may transfer a data write command (Write CMD) to the data storage device 100 (S220).

Since the data storage device 100 is in a state in which the SPOR operation is disabled, the data storage device 100 may only transfer a response signal to indicate work completion to the host 200 without performing a backup operation (S225).

Subsequently, the host 200 may transfer a synchronization command (Sync CMD) to the data storage device 100 (S230).

Since the data storage device 100 is in a state in which the SPOR operation is disabled, the data storage device 100 may only transfer a response signal to indicate work completion to the host 200 without performing a synchronization operation for transmitting the data stored in the cache 120 to the memory 130 (S235).

In another example, the detachability attribute of the battery 300 may be a detachable type and the charge rate of the battery 300 may be lower than the threshold charge rate (e.g., 10%). In this case, the host 200 may transfer the battery information including the detachability attribute of the battery 300 and the charge rate of the battery 300 to the data storage device 100 (S250).

Subsequently, the data storage device 100 may determine whether or not to enable the SPOR operation, based on the received detachability attribute and charge rate of the battery 300 (S255). In this case, since the detachability attribute of the battery 300 is detachable type or the charge rate of the battery 300 is lower than the threshold charge rate (e.g., 10%), the SPOR operation may be enabled (protection enable).

Subsequently, the host 200 transfers a data write command (Write CMD) to the data storage device 100 (S260).

Since the data storage device 100 is in a state in which the SPOR operation is enabled, the data storage device 100 may perform a backup operation. Specifically, the data storage device 100 may perform an LSB backup operation for storing the LSB of the LSM and MSB included in the received data in the cache 120 or the high-speed area (e.g., SLC) of the memory 130. After the completion of the backup operation, the data storage device 100 may transfer a response signal to indicate work completion to the host 200 (S265).

Subsequently, the host 200 may transfer a synchronization command (Sync CMD) to the data storage device 100 (S270).

Thus, since the data storage device 100 is in a state in which the SPOR operation is enabled, the data storage device 100 may perform a synchronization operation for transmitting the data stored in the cache 120 to the memory 130. After the completion of the synchronization operation, the data storage device 100 may transfer a response signal to indicate work completion to the host 200 (S275).

That is, in the data processing system 300, whether or not to perform the SPOR operation may be determined based on the detachability attribute of the battery 300 and the charge rate of the battery 300, thereby improving the performance of the system and the lifetime of the data storage device while maintaining the stability of the system high.

Figure 5:
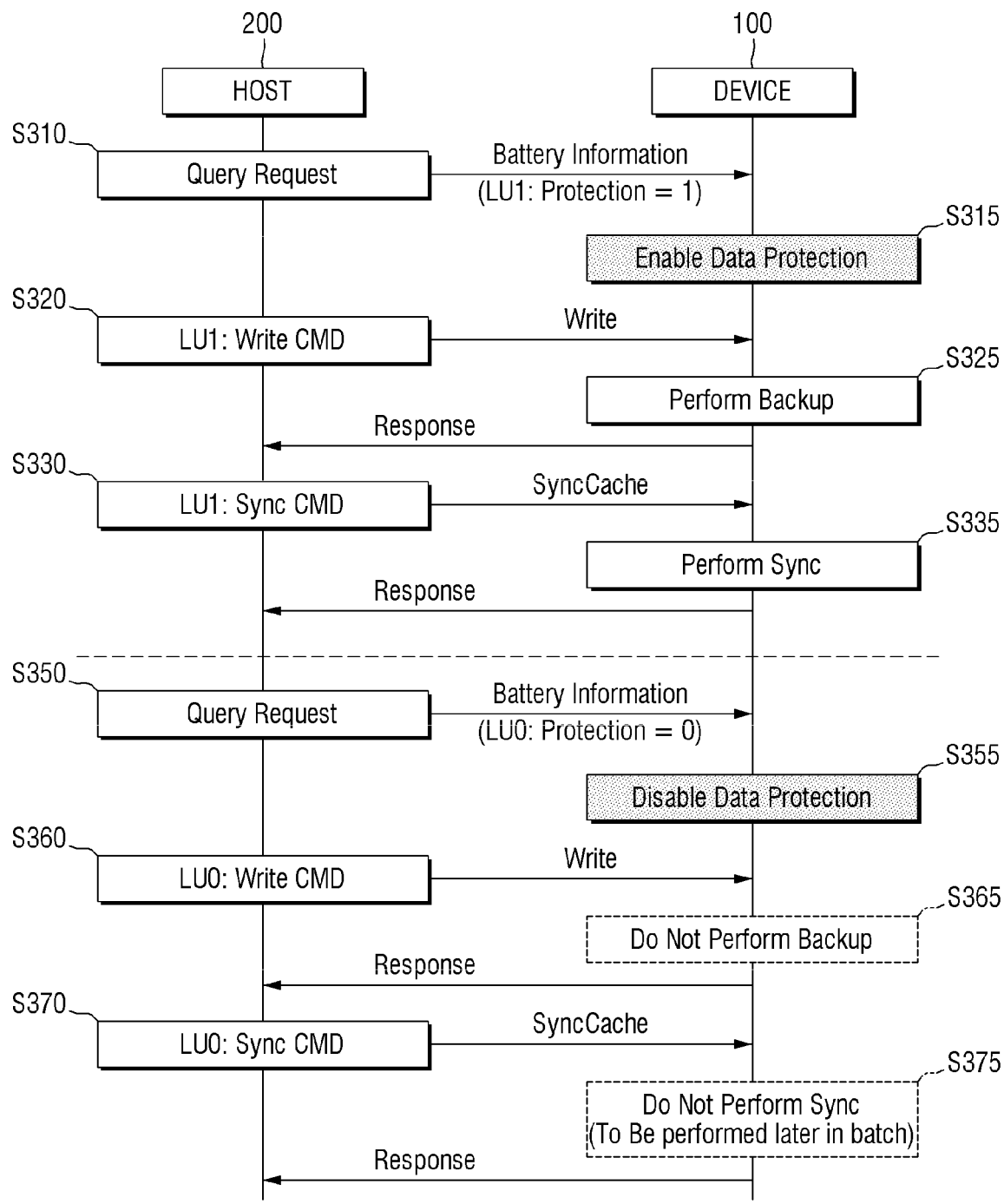
FIG. 5 is a flowchart for illustrating the operation of a data processing system according to an exemplary embodiment.

FIG. 5 is a flowchart for illustrating the operation of a data processing system according to an exemplary embodiment. For the convenience of explanation, hereinafter, duplicative descriptions will be omitted, and differences will be mainly described.

As shown in FIG. 5, the data storage device 100 may receive the detachability attribute of the battery 300 and the data protection attribute from the host 200. As described above with reference to FIG. 1, the data protection attribute transferred from the host 200 to the data storage device 100 may be included in the battery information together with the detachability attribute of the battery 300, or may be transferred separately from the battery information (S310). Meanwhile, the data received from the host 200 to the data storage device 100 may include a plurality of logical units (LU).

The host 200 may set a protection attribute for each logical unit LU. The data storage device 100 may determine whether or not to perform the SPOR operation, based on the protection attribute of the received logical unit LU.

However, in this embodiment, when the detachability attribute of the battery 300 is a detachable type, the SPOR operation is unconditionally performed. Therefore, the protection attribute of the logical unit LU may be considered only when the detachability attribute of the battery is a fixed type.

For example, when the detachability attribute of the battery 300 is a fixed type and the data protection attribute of the received first logical unit LU1 is enabled (e.g., when the data protection value included in the protection attribute is "1"), the data processing system may enable a data protection function (S315).

Subsequently, the host 200 may transfer a data write command (Write CMD) to the data storage device 100 (S320). Thus, since the data storage device 100 is in a state in which the SPOR operation is enabled, the data storage device 100 may perform a backup operation (S325). Specifically, the data storage device 100 may perform an LSB backup operation for storing the LSB of the LSM and MSB included in the received data in the cache 120 or the high-speed area (e.g., SLC) of the memory 130. After the completion of the backup operation, the data storage device 100 transfers a response signal to indicate work completion to the host 200.

Subsequently, the host 200 may transfer a data synchronization command (Sync CMD) to the data storage device 100 (S330). Thus, since the data storage device 100 is in a state in which the SPOR operation is enabled, the data storage device 100 may perform a synchronization operation for transmitting the data stored in the cache 120 to the memory 130 (S335). After the completion of the synchronization operation, the data storage device 100 may transfer a response signal to indicate work completion to the host 200.

As another example, when the detachability attribute of the battery 300 is a fixed type and the protection attribute of the received second logical unit LU0 is disabled (e.g., when the data protection value included in the protection attribute is "0"), the data processing system may enable a data protection function (S350, S355).

Subsequently, the host 200 may transfer a data write command (Write CMD) to the data storage device 100 (S360). Thus, since the data storage device 100 is in a state in which the SPOR operation is disabled, the data storage device 100 may only transfer a response signal to indicate work completion to the host 200 without performing a backup operation (S365).

Subsequently, the host 200 may transfer a synchronization command (Sync CMD) to the data storage device 100 (S370). Since the data storage device 100 is in a state in which the SPOR operation is disabled, the data storage device 100 may only transfer a response signal to indicate work completion to the host 200 without performing a synchronization operation for transmitting the data stored in the cache 120 to the memory 130 (S375).

That is, in the data processing system 300, whether or not to perform the SPOR operation is determined based on the detachability attribute of the battery 300 and the data protection attribute of the plurality of logical units LU included in the data, thereby improving the performance of the system and the lifetime of the data storage device while maintaining the stability of the system high.

Figure 6:
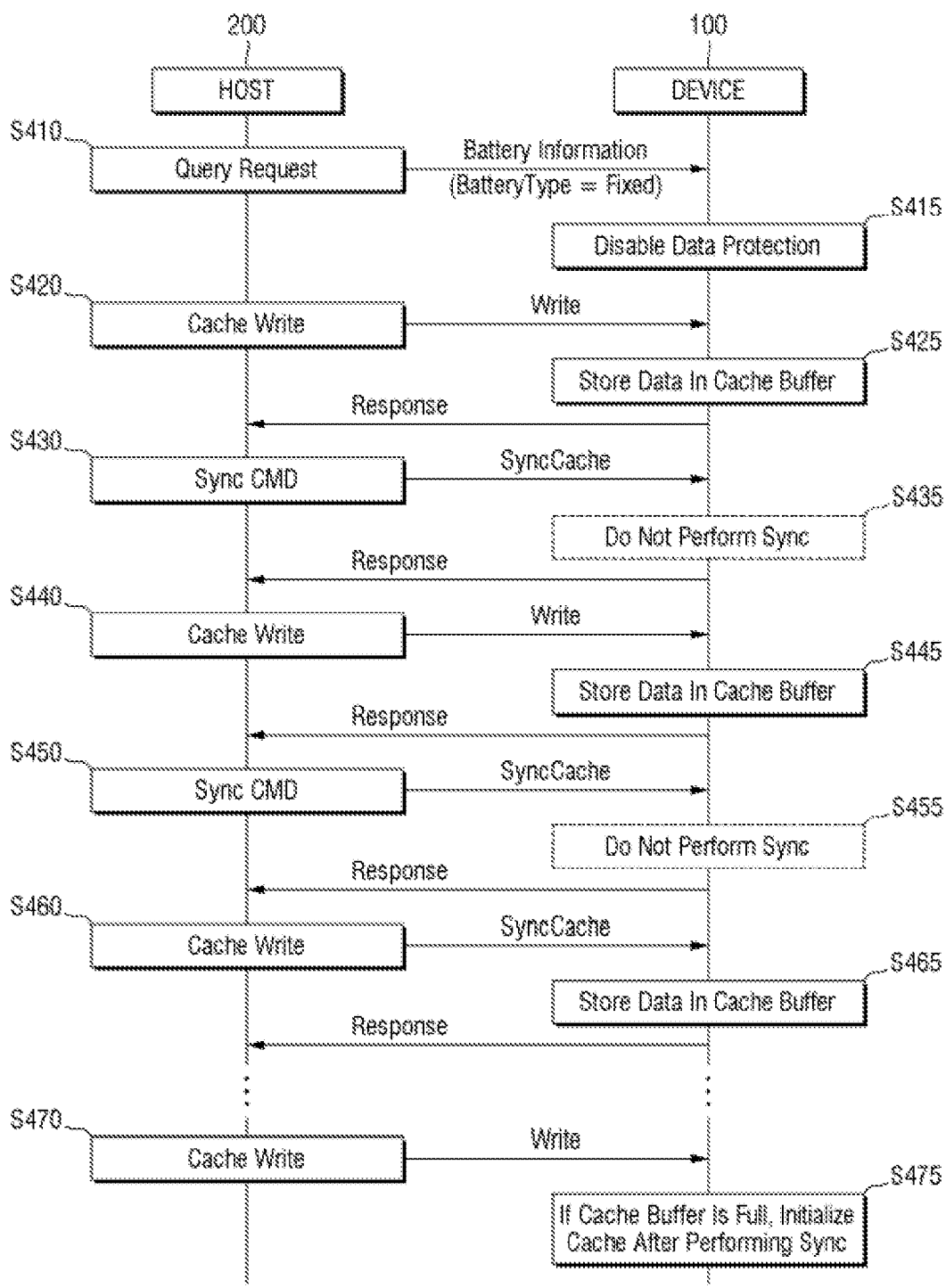
FIG. 6 is a flowchart for illustrating the operation of a data processing system according to an exemplary embodiment.

FIG. 6 is a flowchart for illustrating the operation of a data processing system according to an exemplary embodiment of the present disclosure. For the convenience of explanation, hereinafter, duplicative descriptions will be omitted, and differences will be mainly described.

As shown in FIG. 6, the host 200 may transfer the battery information including the detachability attribute of the battery 300 to the data storage device 100 (S410). In this case, the detachability attribute of the battery 300 is a fixed type.

Subsequently, the data storage device 100 may receive the battery information including the detachability attribute of the battery 300 from the host 200, and then determine whether to enable the SPOR operation (S415). In this case, since the detachability attribute of the battery 300 is a fixed type, the SPOR operation is disabled (protection disable).

Subsequently, the host 200 may transfer a cache write command (Cache Write CMD) to the data storage device 100 (S420). Thus, the data storage device 100 may store the data received from the host 200 in the buffer of the cache 120 regardless of the enabling of the SPOR operation (S425). After the completion of the operation, the data storage device 100 may transfer a response signal to indicate work completion to the host 200.

Subsequently, the host 200 may transfer a synchronization command (Sync CMD) to the data storage device 100 (S430). Since the data storage device 100 is in a state in which the SPOR operation is disabled, the data storage device 100 may only transfer a response signal to indicate work completion to the host 200 without performing a synchronization operation for transmitting the data stored in the cache 120 to the memory 130 (S435).

Subsequently, in operations S440 to S465, the aforementioned operations S420 to S435 may be repeated. In this case, these operations may be performed in a sequence different from the order shown in FIG. 6.

Subsequently, once the storage space of the buffer of the cache 120 is full, when the data storage device 100 receives another cache write command (Cache Write CMD) from the host 200 (S470), a synchronization operation for transmitting the data stored in the cache 120 to the memory 130 may be performed, and then the cache 120 (e.g., SRAM) may be initialized (S475).

That is, the synchronization command (Sync CMD) may not be performed until the storage space of the buffer of the cache 120 is full, at which point the synchronization operation is performed in batch to save the resource of the system. Thus, the performance of the system and the lifetime of the data storage device may be improved while maintaining the stability of the system high.

Figure 7:
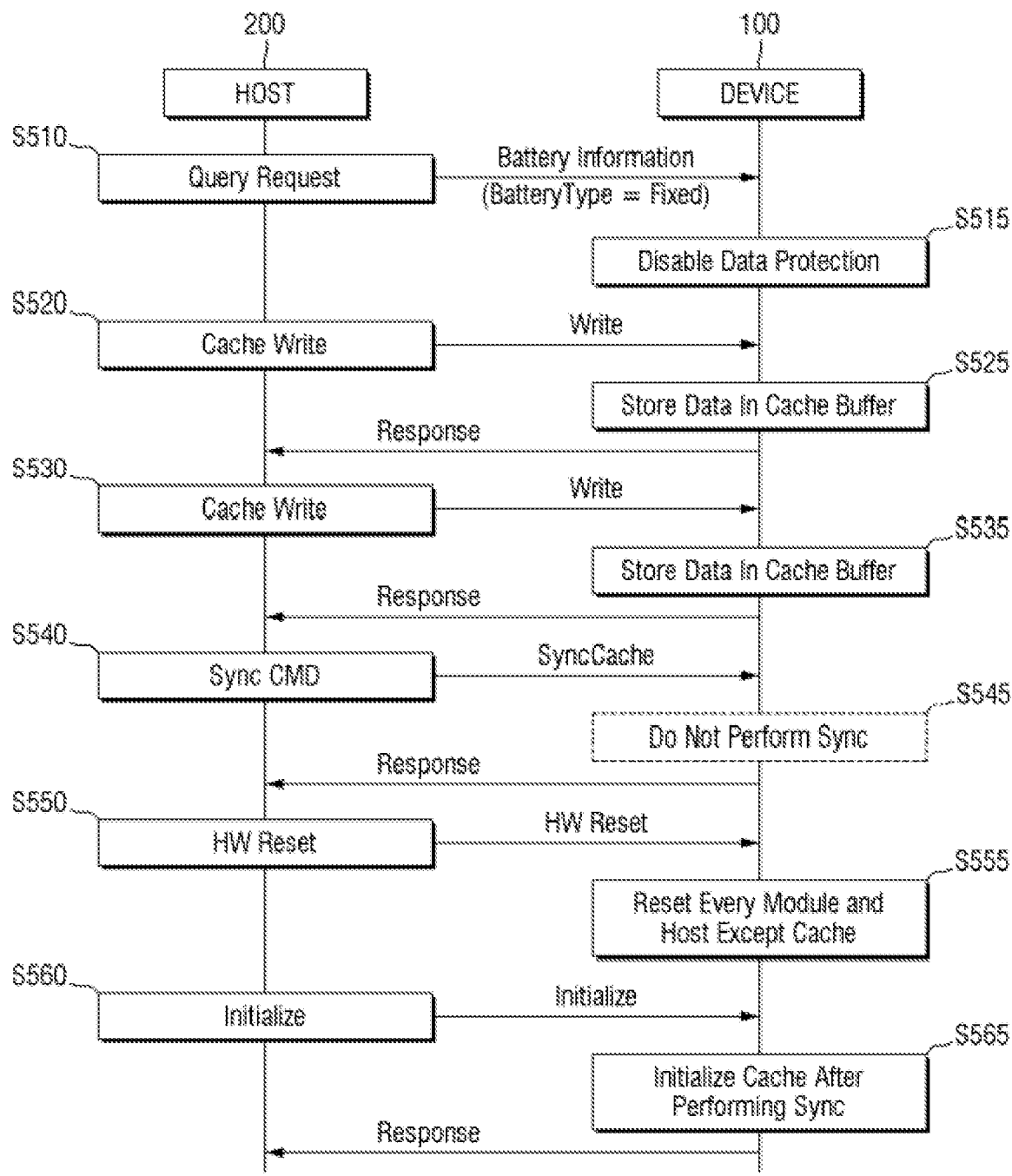
FIG. 7 is a flowchart for illustrating the operation of a data processing system according to an exemplary embodiment.

FIG. 7 is a flowchart for illustrating the operation of a data processing system according to an exemplary embodiment. For the convenience of explanation, hereinafter, duplicative descriptions will be omitted, and differences will be mainly described.

As shown in FIG. 7, the host 200 may transfer the battery information including the detachability attribute of the battery 300 to the data storage device 100 (S510). In this example, the detachability attribute of the battery 300 may be a fixed type.

Subsequently, the data storage device 100 may receive the battery information including the detachability attribute of the battery 300 from the host 200, and then determine whether to enable the SPOR operation (S515). In this case, since the detachability attribute of the battery 300 is a fixed type, the SPOR operation may be disabled (protection disable).

Subsequently, the host 200 may transfer a cache write command (Cache Write CMD) to the data storage device 100 (S520). The data storage device 100 may store the data received from the host 200 in the buffer of the cache 120 regardless of the enabling of the SPOR operation (S525). After the completion of the operation, the data storage device 100 may transfer a response signal to indicate work completion to the host 200.

Subsequently, in operations S530 to S535, the aforementioned operations S520 to S525 are repeated.

Subsequently, the host 200 may transfer a synchronization command (Sync CMD) to the data storage device 100 (S540). Since the data storage device 100 is in a state in which the SPOR operation is disabled, the data storage device 100 may transfer only a response signal to indicate work completion to the host 200 without performing a synchronization operation for transmitting the data stored in the cache 120 to the memory 130 (S545).

Subsequently, the host 200 may transfer a hardware reset command (HW reset CMD) to the data storage device 100. Thus, the data storage device 100 may reset all other components (e.g., the controller 110, the memory 130, and the interface 140) except for the cache 120 (S555). In this case, the host itself may also perform the reset operation.

Subsequently, the host 200 may transfer an initialization command to the data storage device 100. The data storage device 100 may reset all other components (e.g., the controller 110, the memory 130, and the interface 140) except for the cache 120, perform a synchronization operation for transmitting the data stored in the cache 120 to the memory 130, and then initialize the cache 120 (S565). The data storage device 100 may transfer a response signal to indicate work completion to the host 200.

That is, data may be stored in the cache 120 without subsequently performing the synchronization command (Sync CMD). However, when the hardware reset command is provided, all other components except for the cache 120 may be reset and initialized, and then the cache is synchronized, thereby safely preserving the data stored in the cache 120. Thus, the performance of the system and the lifetime of the data storage device can be improved while maintaining the stability of the data processing system of the present disclosure high.

Hereinafter, specific operations of the data storage device 100 and the data processing system including the data storage device 100 according to the charging operation state attribute of the battery 300 will be described.

Figure 8:
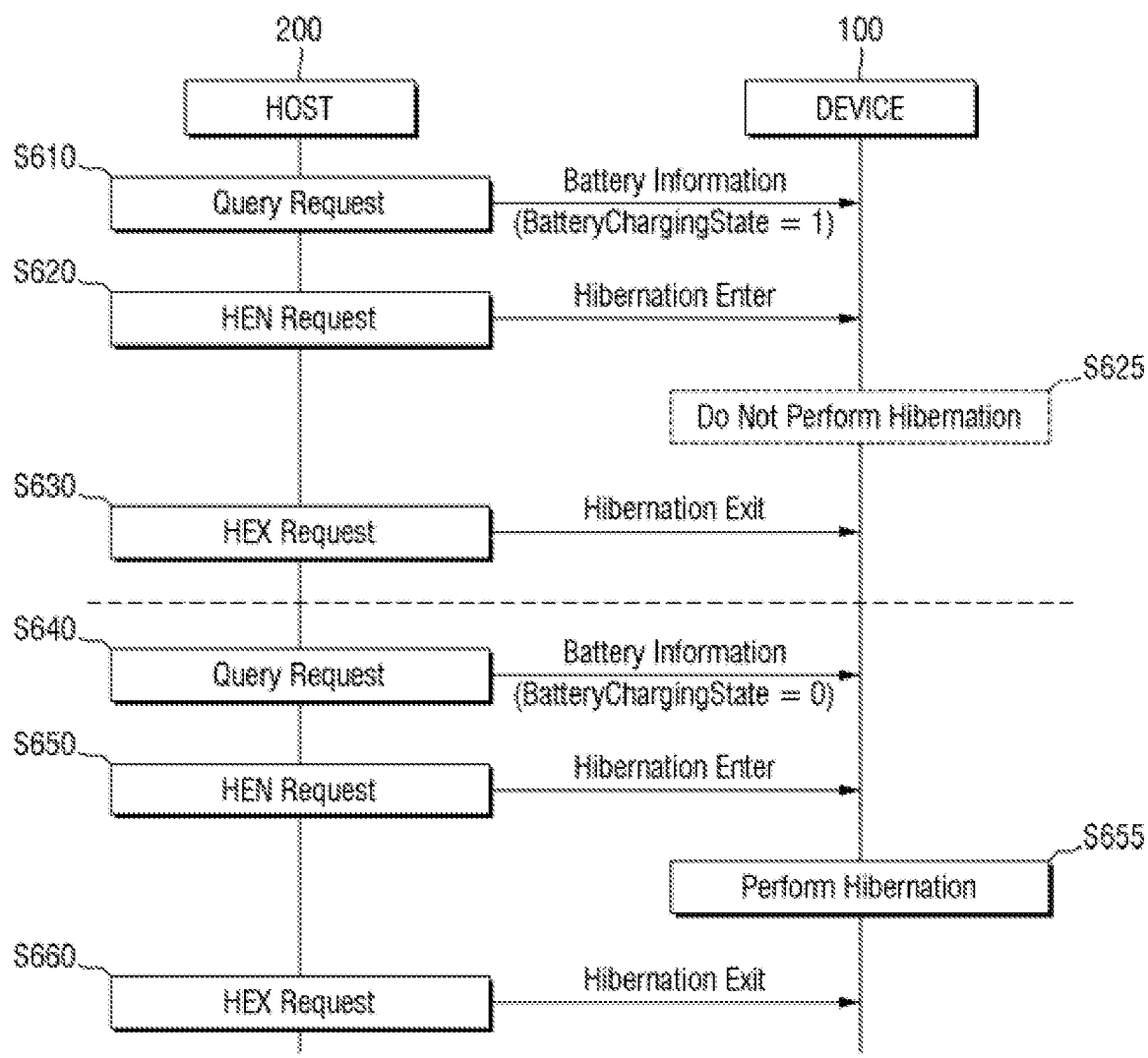
FIG. 8 is a flowchart illustrating the operation of a data processing system according to an exemplary embodiment.

FIG. 8 is a flowchart illustrating the operation of a data processing system according to an exemplary embodiment.

As shown in FIG. 8, when the battery 300 is charging, the data processing system may not perform hibernation (e.g., low-power operation mode during which content of the random access memory (RAM) is stored in a non-volatile memory). Conversely, when the battery 300 is not charging, the data processing system may perform hibernation.

Specifically, the host 200 may transfer battery information including a charging operation state attribute of the battery 300 to the data storage device 100 (S610). At this time, the charging operation state attribute of the battery 300 may have a first value (e.g., "1") indicating that the battery 300 is charging at that time. The host 200 may transfer the battery information including the charging operation state attribute of the battery 300 using a query request protocol.

Subsequently, the host 200 may transmit a hibernation enter request (HEN request) to the data storage device 100 (S620).

The data storage device 100 may not perform hibernation because the charging operation state attribute indicates that the battery 300 is charging at that time (S625).

Thereafter, the host 200 may transmit the hibernation exit request (HEX request) to the data storage device 100 (S630). Since the hibernation has not been performed in the data storage device 100, the data storage device 100 receiving the hibernation exit request (HEX request) may not perform any operation in response to the hibernation exit request (HEX request).

Meanwhile, the host 200 may transfer battery information including the charging operation state attribute of the battery 300 to the data storage device 100 (S640). At this time, the charging operation state attribute of the battery 300 may have a second value (e.g., "0") indicating that the battery 300 is not charging at that time. The host 200 may transfer the battery information including the charging operation state attribute of the battery 300 using a query request protocol.

Subsequently, the host 200 may transmit the hibernation entry request (HEN request) to the data storage device 100 (S650).

Thus, since the charging operation state attribute indicates that the battery 300 is not charging at that time, the data storage device 100 may perform hibernation to enter the hibernation state (S655).

Thereafter, the host 200 may transmit the hibernation exit request (HEX request) to the data storage device 100 (S660). The data storage device 100 may terminate the hibernation according to the hibernation exit request (HEX request).

As such, the data processing system may selectively perform hibernation based on the charging operation state attribute of the battery 300. The performance of the data processing system and the lifetime of the data storage device can be improved by adjusting the execution time of a background operation as described later with reference to FIG. 9 while selectively performing the hibernation.

Figure 9:
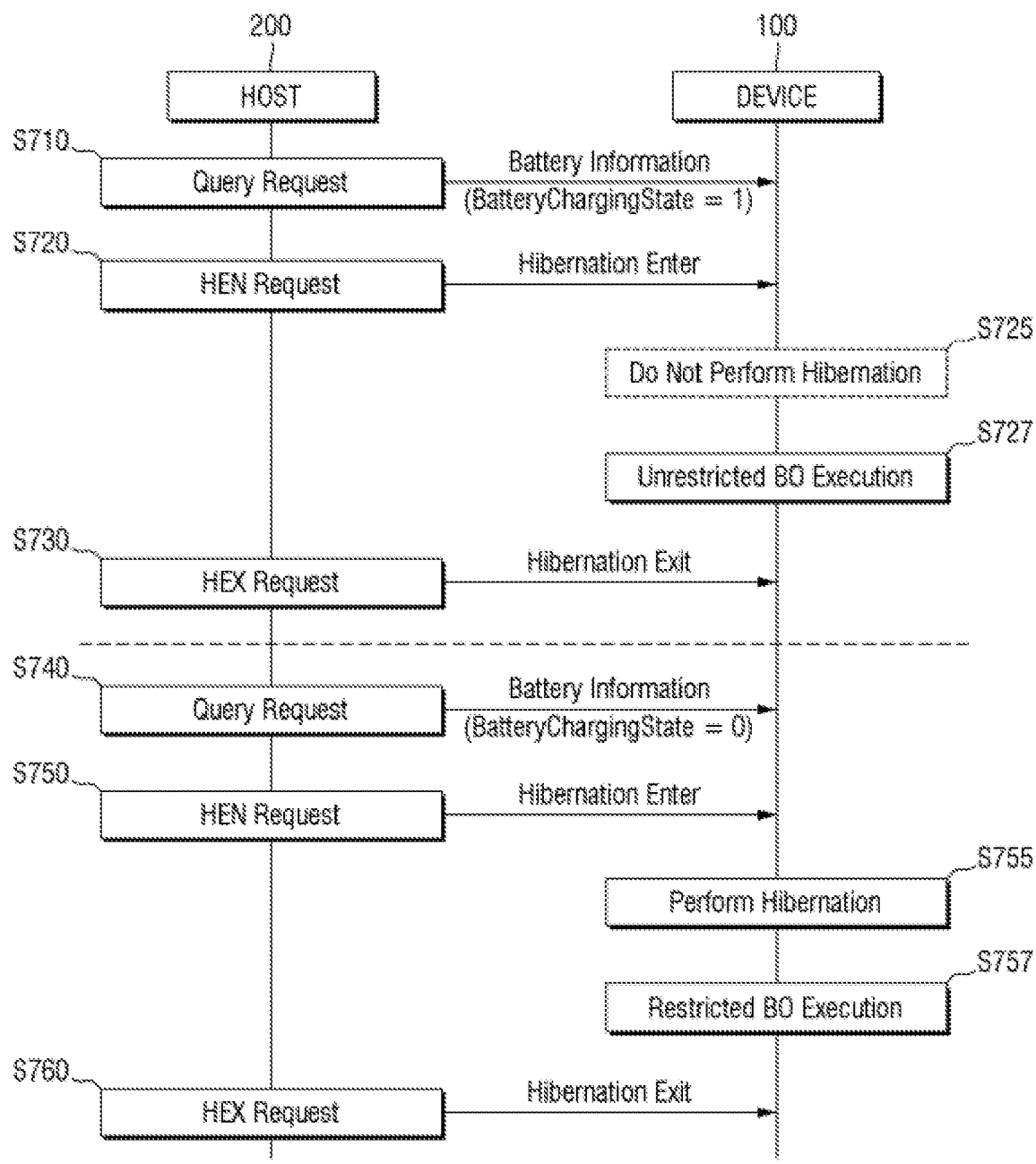
FIG. 9 is a flowchart illustrating the operation of a data processing system according to an exemplary embodiment.

FIG. 9 is a flowchart illustrating the operation of a data processing system according to an exemplary embodiment.

As shown in FIG. 9, when the battery 300 is charging, the data processing system may not perform hibernation and perform a background operation (BO) without restrictions. Conversely, when the battery 300 is not charging, the data processing system may perform hibernation and perform a background operation (BO) with restrictions.

Here, for example, when the memory 130 described with reference to FIG. 2 includes a NAND flash memory, the background operation may include a garbage collection operation, a wear-leveling operation, and the like, which are required to operate the NAND flash memory.

Specifically, the host 200 may transfer battery information including a charging operation state attribute of the battery 300 to the data storage device 100 (S710). At this time, the charging operation state attribute of the battery 300 may have a first value (e.g., "1") indicating that the battery 300 is charging at that time. The host 200 may transfer the battery information including the charging operation state attribute of the battery 300 using a query request protocol.

Subsequently, the host 200 may transmit a hibernation enter request (HEN request) to the data storage device 100 (S720).

Thus, the data storage device 100 may not perform hibernation because the charging operation state attribute indicates that the battery 300 is charging at that time (S725).

Further, the data storage device 100 may perform the background operation without restrictions (S727). Here, "without restrictions" means that there is no time limit for the background operation. That is, the data storage device 100 may perform the background operation for a sufficient time while power is supplied without interruption because the battery 300 is charging.

Thereafter, the host 200 may transmit the hibernation exit request (HEX request) to the data storage device 100 (S730). Since hibernation has not been performed in the data storage device 100, the data storage device 100 receiving the hibernation exit request (HEX request) need not perform any operation in response to the hibernation exit request (HEX request).

However, it should be noted that, in some exemplary embodiments, when the background operation performed in operation 727 (S727) is completed and thus there is no more work to be processed, hibernation may be performed in the data storage device 100. In this case, when the host 200 transmits a hibernation exit request (HEX request) to the data storage device 100 in operation 730 (S730), the data storage device 100 may terminate the hibernation according to the received hibernation exit request (HEX request).

Meanwhile, the host 200 may transfer battery information including the charging operation state attribute of the battery 300 to the data storage device 100 (S740). At this time, the charging operation state attribute of the battery 300 may have a second value (e.g., "0") indicating that the battery 300 is not charging at that time. The host 200 may transfer the battery information including the charging operation state attribute of the battery 300 using a query request protocol.

Subsequently, the host 200 may transmit the hibernation entry request (HEN request) to the data storage device 100 (S750).

Since the charging operation state attribute indicates that the battery 300 is not charging at that time, the data storage device 100 may perform hibernation to enter the hibernation state (S755).

Further, the data storage device 100 may perform the background operation with restrictions (S757). Here, "with restrictions" means that background operation time is limited to a predetermined time. That is, the data storage device 100 may perform the background operation only for a certain period of time when the battery 300 is not charging and thus the power source may not be stable.

Thereafter, the host 200 may transmit the hibernation exit request (HEX request) to the data storage device 100 (S760). The data storage device 100 may terminate the hibernation according to the hibernation exit request (HEX request).

As such, the performance of the data processing system and the lifetime of the data storage device can be improved by selectively performing the hibernation depending on the charging operation state attribute of the battery 300 and adjusting the execution time of the background operation.

Figure 10A:
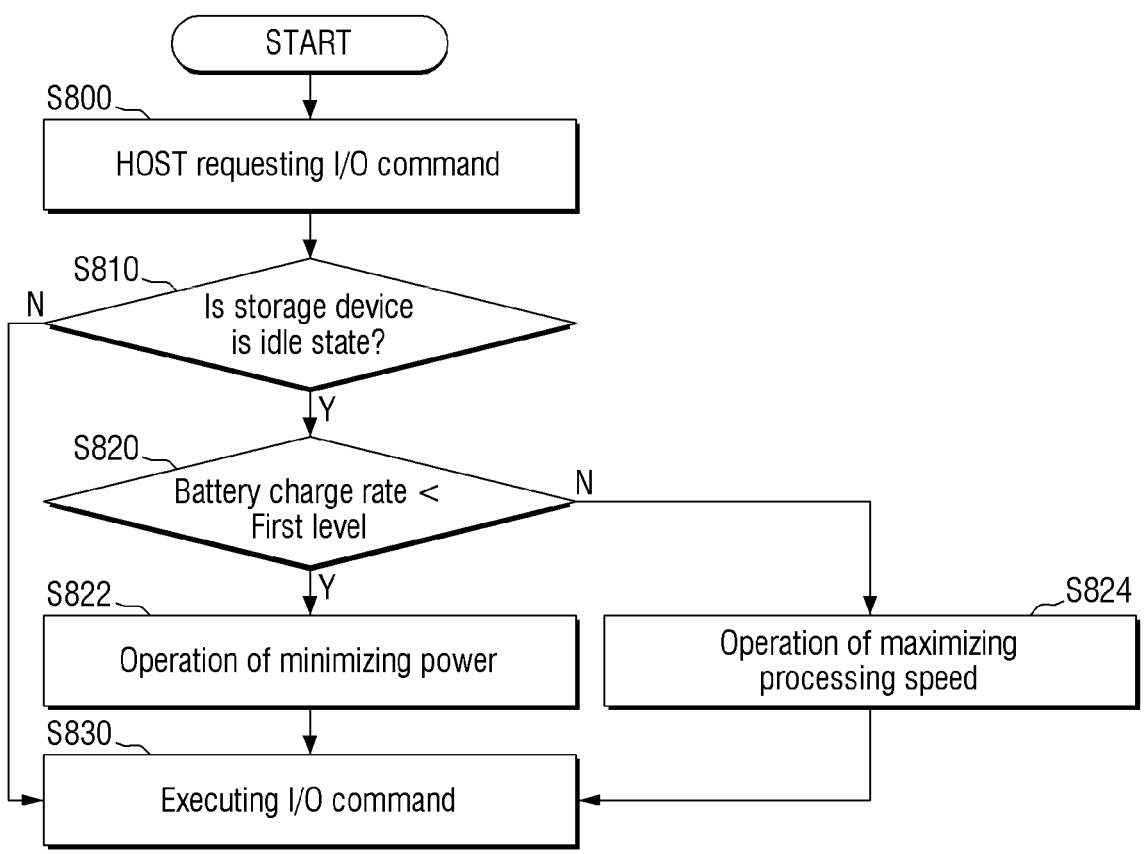
FIG. 10A is a flowchart for explaining the operation of a data processing system according to some embodiments.

FIG. 10A is a flowchart for explaining the operation of a data processing system according to some embodiments.

Referring to FIG. 10A, in some example embodiments, an input/output command may be requested from the host 200 (S800).

In some example embodiments, when the input/output command is requested from the host 200, the active operation mode of the data storage device 100 may be determined according to whether or not the data storage device 100 is an idle state or whether or not the data storage device 100 is an active state (S810).

The idle state may refer to a state in which the data storage device 100 does not perform an input/output operation. For example, the idle state may be a state in which the data storage device 100 enters hibernation described with reference to FIGS. 8 and 9. For example, the idle state may be a state from the completion of execution of the input/output command until the entry into hibernation described with reference to FIGS. 8 and 9.

In contrast, the active state may refer to a state in which the data storage device 100 is performing the input/output operation.

In some example embodiments, when the input/output command is requested from the host 200, when the data storage device is an idle state, it is determined whether or not the charge rate of a battery is less than a first level (S820).

If the charge rate of a battery is less than the first level, the active operation mode of the data storage device 100 is determined as a first mode in which the input and output commands are performed by minimizing power consumption (S822).

If the charge rate of a battery is the first level or more, the active operation mode of the data storage device 100 is determined as a second mode in which the input/output command is executed by maximizing processing speed (S824). That is, the active operation mode may be a mode in which the data storage device 100 performs the input/output command.

When the active operation mode (the first mode or the second mode) is determined, the input/output command is executed in the corresponding active operation mode (S830). For a detailed description, a method of determining the active operation mode will be described with reference to FIG. 10B.

Figure 10B:
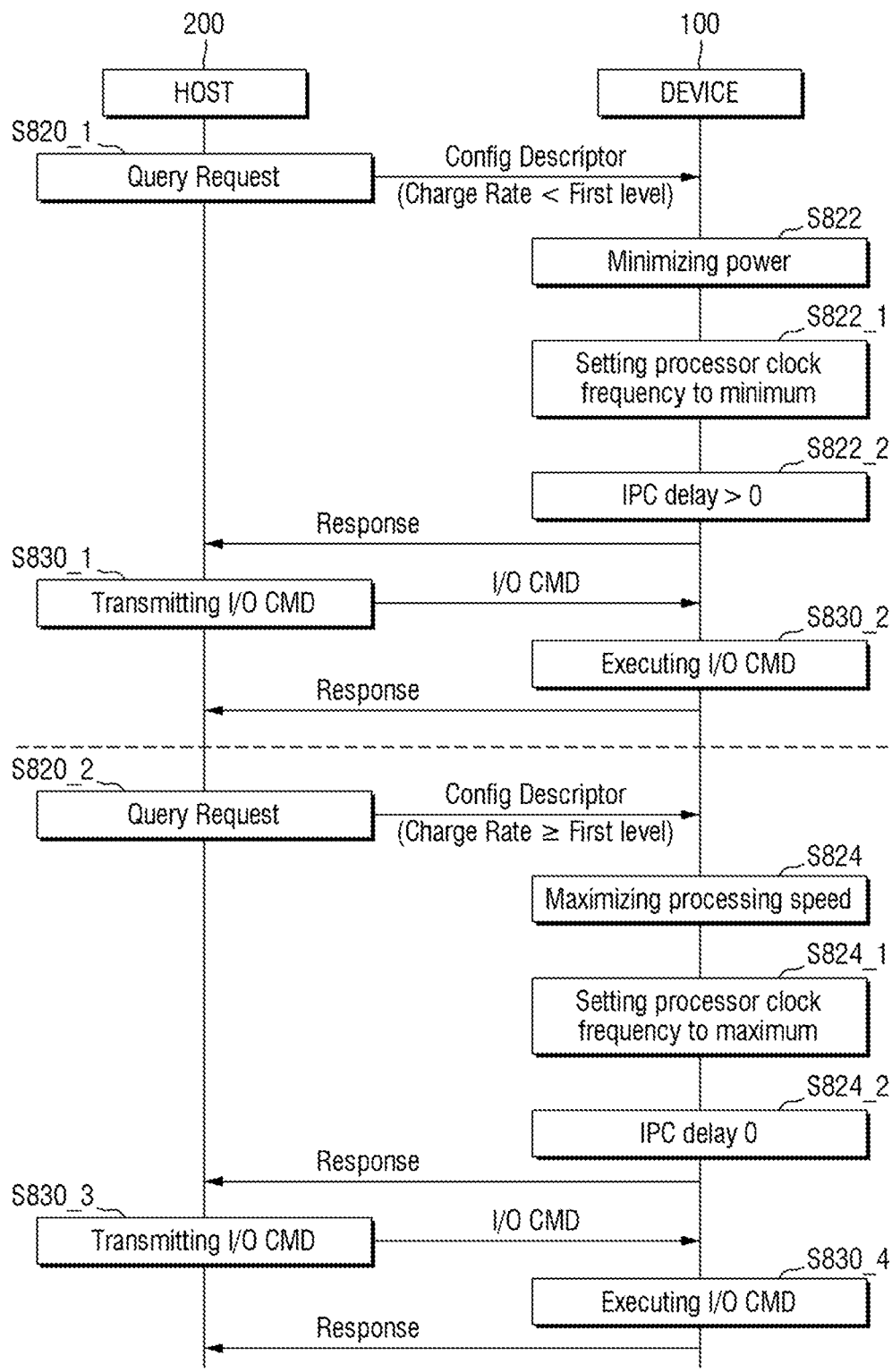
FIG. 10B is a flowchart for explaining the operation of a data processing system according to some embodiments.

FIG. 10B is a flowchart for explaining the operation of a data processing system according to some embodiments. For the convenience of explanation, hereinafter, the same contents as those in the above-described exemplary embodiment will be omitted, and differences will be mainly described.

Referring to FIG. 10B, in some example embodiments, the data storage device 100 may receive battery information including the charge rate of the battery 300 from the host 200.

When the charge rate of the battery 300 is less than the first level, the data processing system may operate in the first mode operating with minimum power consumption. In contrast, when the charge rate of the battery 300 is the first level or more, the data processing system may operate in the second mode operating with maximum processing speed. In some example embodiments, the first level may be 10%, which has been described with reference to FIG. 4, but the present disclosure is not limited thereto.

In some example embodiments, assuming the charge rate of the battery 300 is less than the first level as an example, the host 200 transmits battery information including the charging rate of the battery 300 to the data storage device 100 (S820_1).

Subsequently, the data storage device 100 receives the battery information including the charge rate of the battery 300 from the host 200, and then determines the active operation mode of the data storage device 100. In this case, since the charge rate of the battery 300 is less than the first level, the active operation mode of the data storage device 100 is determined as the first mode operating with minimum power consumption, and a response signal is transmitted to the host 200 (S822).

In the first mode operating with minimum power consumption, for example, the clock frequency of the interface 140 and/or controller 110 included in the data storage device 100 may be set to a predetermined minimum value (S822_1). As the clock frequency of the processor decreases, the operation amount to be processed by the processor at the same time decreases, and thus power consumption can be reduced.

Further, for example, in the first mode, IPC (inter processor communication) delay time may be set to more than 0 (S822_2). In some example embodiments, the IPC may refer to the communication between the processor of the interface 140 included in the data storage device 100 and the processor of the controller 110 included in the data storage device 100. For example, the interface 140 may receive data from the host 200. The controller 110 may receive data from the interface 140, and may transmit the data to the memory 130. Further, the controller 110 may read data from the memory 130. The interface 140 may receive the data read by the controller 110, and may transmit this received data to the host 200. That is, the IPC may transmit data between the controller 110 and the interface 140. For example, when delay time is set to more than 0 in the IPC, the operation amount to be processed by the controller 110 and the interface 140 at the same time decreases, and thus power consumption can be reduced.

Subsequently, the host 200 transmits the input/output command (I/O CMD) of data to the data storage device 100 (S830_1).

Subsequently, the data storage device 100 performs an input/output operation in the first mode, and transmits a response signal to the host 200 when the input/output operation is completed (S830_2).

In some example embodiments, assuming the charge rate of the battery 300 is the first level or more as an example, the host 200 transmits battery information including the charging rate of the battery 300 to the data storage device 100 (S820_2).

Subsequently, the data storage device 100 receives the battery information including the charge rate of the battery 300 from the host 200, and then the active operation mode of the data storage device 100 is determined. In this case, since the charge rate of the battery 300 is the first level or more, the active operation mode of the data storage device 100 is determined as the second mode operating with maximum operation processing speed, and a response signal is transmitted to the host 200 (S824).

In the second mode operating with maximum operation processing speed, for example, the clock frequency of the interface 140 and/or controller 110 included in the data storage device 100 may be set to a predetermined maximum value (S824_1). As the clock frequency of the processor increases, the operation amount to be processed by the processor at the same time increases, and thus operation processing speed can be increased.

Further, in the second mode, for example, IPC (inter processor communication) delay time may be set to 0 (S824_2). When the IPC delay time is set to 0, the operation amount to be processed by the controller 110 and the interface at the same time is maximized, and thus the operation processing speed can be maximized.

Subsequently, the host 200 transmits the input/output command (I/O CMD) of data to the data storage device 100 (S830_3).

Subsequently, the data storage device 100 performs an input/output operation in the second mode, and transmits a response signal to the host 200 when the input/output operation is completed (S830_4).

Referring to FIG. 10A again, in some example embodiments, when an input/output command is requested from the host 200, if the data storage device 100 is an active state, the data storage device 100 performs the input/output command in the current operation mode (i.e. operation mode of the active state) of the data storage device 100, that is, the operation mode in which the data storage device 100 is current performing the input/output command (S830).

That is, in some example embodiments, the data processing system determines the input/output operation mode of the data storage device 100 in consideration of the charge rate of the battery 300, thereby improving the performance of the system and the lifetime of the data storage device.

Figure 11:
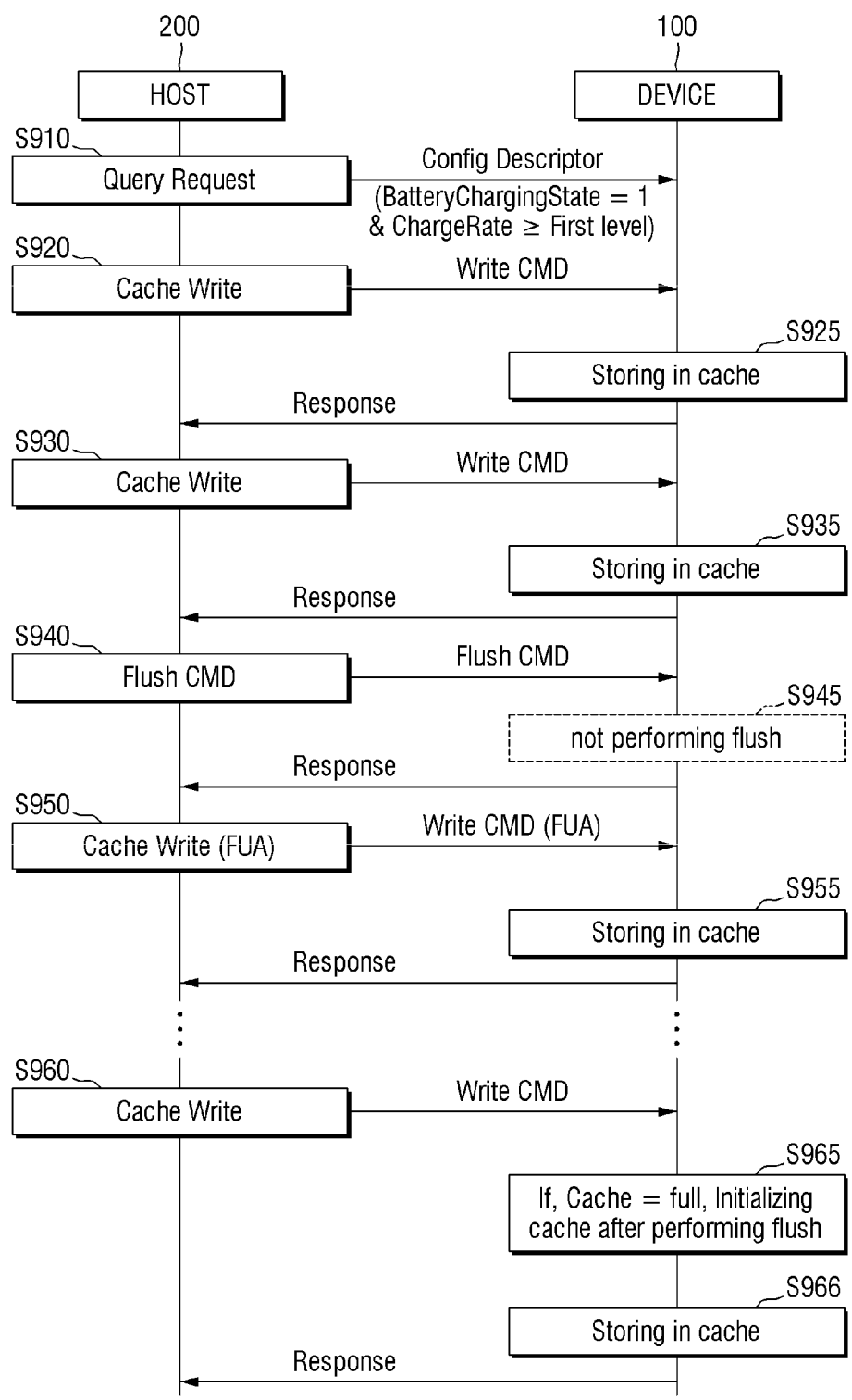
FIG. 11 is a flowchart for explaining the operation of a data processing system according to some embodiments.

FIG. 11 is a flowchart for explaining the operation of a data processing system according to some embodiments.

Referring to FIG. 11, in some example embodiments, when the battery 300 is being charged and the charge rate of the battery 300 is the first level or more, the data storage device 100 may not perform a flush operation or a force unit access operation even when the data storage device 100 receives a flush command (Flush CMD) or a write command of data including force unit access (Write CMD (FUA)) from the host 200. The flush operation and the force unit access operation will be described with reference to FIGS. 12A and 12B.

Figure 12A:
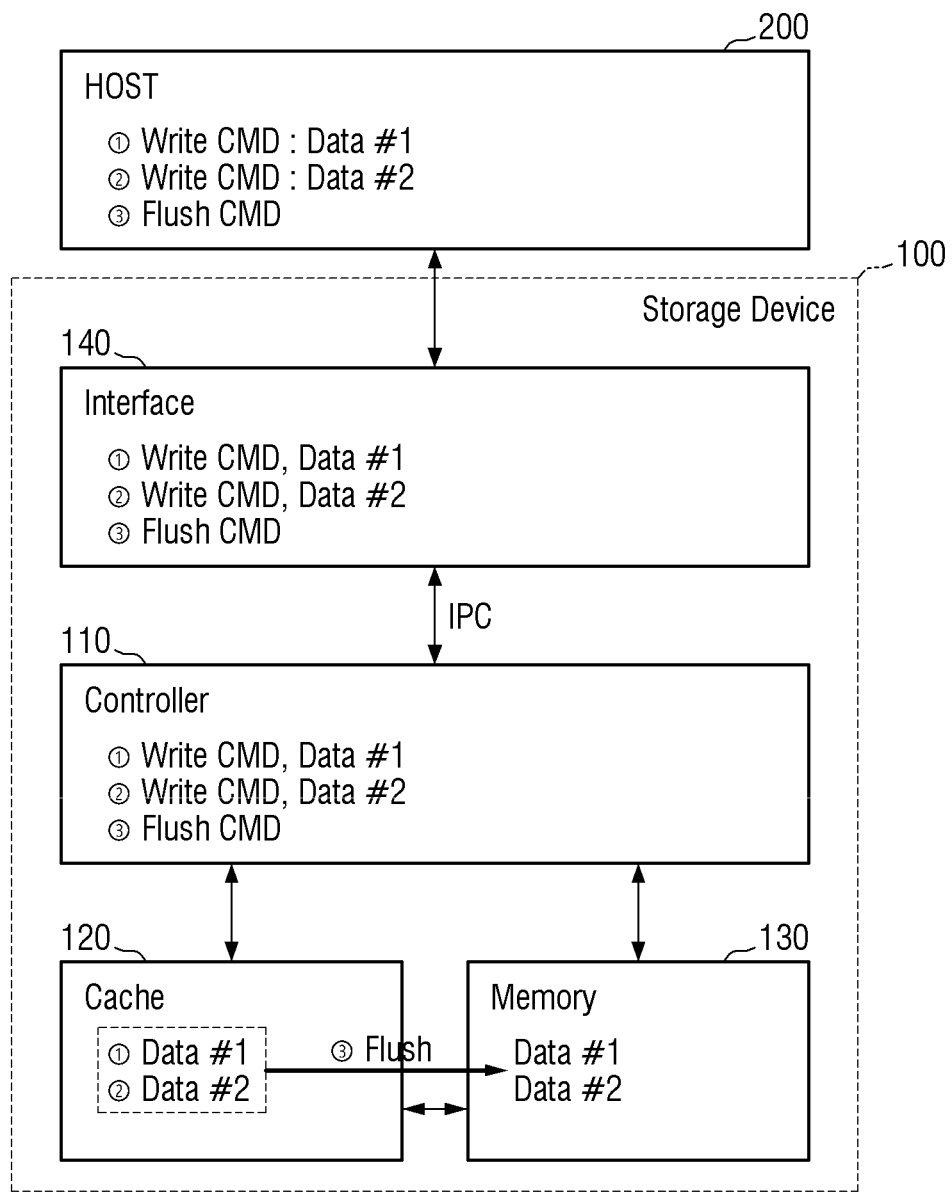
FIG. 12A is an exemplary view for explaining the flush operation of a data storage device according to some embodiments.

FIG. 12A is an exemplary view for explaining the flush operation of a data storage device according to some embodiments.

Referring to FIG. 12A, the host 200 may transmit the write command of first data (Write CMD: Data #1) to the data storage device 100. The interface 140 of the data storage device 100 may receive a write command (Write CMD) and first data (Data #1) and transmit the received write command (Write CMD) and first data (Data #1) to the controller 110. The controller 110 having received the write command (Write CMD) and the first data (Data #1) from the interface 140 may not directly store the first data (Data #1) in the memory 130, but temporarily store the first data (Data #1) in the cache (①)).

Similarly, when the host 200 transmits the write command of second data (Write CMD: Data #2) to the data storage device 100, the controller 110 may temporarily store the second data (Data #2) in the cache (②).

The host 200 may transmit the flush command (Flush CMD) to the data storage device 100. The interface 140 of the data storage device 100 may receive the flush command (Flush CMD) from the host 200 and transmit the received flush command (Flush CMD) to the controller 110. The controller 110 having received the flush command (Flush CMD) from the interface 140 may non-temporarily store the first and second data (Data #1 and Data #2) stored in the cache 120 in the memory 130. After the first and second data (Data #1 and Data #2) are non-temporarily stored in the memory 130, the cache 120 may be initialized (③)).

In summary, when the data storage device 100 receives the write command (Write CMD) from the host 200, the data storage device 100 may temporarily store the data in the cache 120. When the data storage device 100 receives the flush command (Flush CMD) from the host 200, it may temporarily store the data temporarily stored in the cache 120 in the memory 130.

Figure 12B:
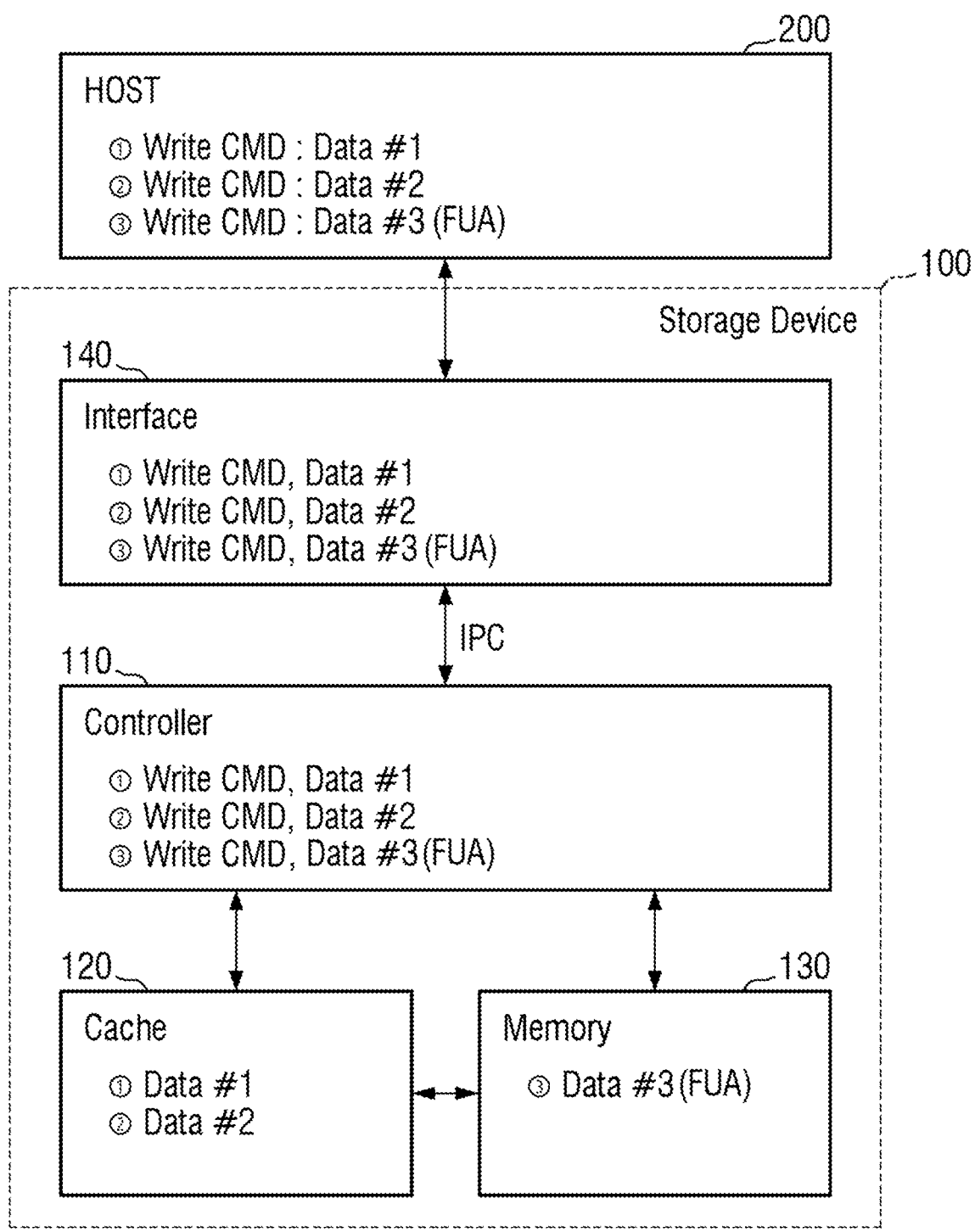
FIG. 12B is an exemplary view for explaining the force unit access operation of a data storage device according to some embodiments.

FIG. 12B is an exemplary view for explaining the force unit access operation of a data storage device according to some embodiments. For the convenience of explanation, a description overlapping FIG. 12A will be omitted or briefly described.

Similarly to the case of FIG. 12A, the data storage device 100 may temporarily store the first and second data (Data #1 and Data #2) in the cache 120 in response to the write command of the first and second data (Write CMD: Data #1 and Data #2) from the host 200 (⑦), ②)).

The host 200 may transmit a write command of third data including force unit access (Write CMD: Data #3(FUA)) to the data storage device 100. The interface 140 of the data storage device 100 may receive the write command (Write CMD) and the third data including force unit access (Data #3(FUA)) from the host 200 and transmit the received write command (Write CMD) and the third data including force unit access (Data #3(FUA)) to the controller 110. The controller 110 having received the write command (Write CMD) and the third data including force unit access (Data #3(FUA)) from the interface 140 may non-temporarily store the third data including force unit access (Data #3(FUA)) in the memory 130, regardless of the presence or absence of the cache 120 and the first and second data (Data #1 and Data #2) stored in the cache 120. As a result, the first and second data (Data #1 and Data #2) may be temporarily stored in the cache 120, and the third data including force unit access (Data #3(FUA)) may be non-temporarily stored in the memory 130 (③)).

In summary, when the data storage device 100 receives the write command of the data including force unit access (Write CMD: Data(FUA)) from the host 200, the data storage device 100 may non-temporarily store the corresponding data in the memory 130, regardless of the presence or absence of the cache 120.

The operation of a data processing system according to some embodiments will be described with reference to FIG. 11 again.

Referring to FIG. 11, in some example embodiments, the host 200 transmit battery information including the charging operation state attribute and charge rate of the battery 300 to the data storage device 100 (S910). In this case, the charging operation state attribute of the battery 300 may have a first value (for example, 1) indicating that the battery 300 is being charged, and the charge rate of the battery 300 may be the first level or more.

Subsequently, the host 200 transmits a write command (Write CMD) to the data storage device 100. Thus, the data storage device 100 stores the data received from the host 200 in the cache 120. After the operation is completed, the data storage device 100 transmits a response signal with respect to the completion of a work to the host 200 (S925).

Subsequently, in S930 and S935, the same processes as the aforementioned S920 and S920 are performed.

Subsequently, the host 200 transmits a flush command (Flush CMD) to the data storage device 100 (S940). The data storage device 100 transmits only the response signal with respect to the completion of a work without performing a flush operation (S945).

Subsequently, the host 200 transmits a write command of data including force unit access (Write CMD (FUA)) to the data storage device 100 (S950). the data storage device 100 stores the data received from the host 200 in the cache 120, not in the memory 130. After storing the data in the cache 120, the data storage device 100 transmits a response signal with respect to the completion of a work to the host 200 (S955). That is, in this case, the data storage device 100 performs the same operation as a simple write command (Write CMD) of data without performing the write command of data including force unit access (Write CMD (FUA)).

Subsequently, when the data storage device 100 receives a write command (Write CMD) from the host 200 but the storage space of the cache 120 is full, the data storage device 100 performs a flush operation of transmitting the data temporarily stored in the cache 120 to the memory 130, and then initializes the cache 120 (S960, S965). After the initialization of the cache 120, the data storage device 100 stores the data received from the host 200 in the cache 120, and transmits a response signal with respect to the completion of a work to the host 200 (S966).

That is, in some example embodiments, the data processing system does not execute the flush command (Flush CMD) and the write command of data including force unit access (Write CMD (FUA)). However, only when the storage space of the cache 120 is full, the data processing system performs a flush operation, thereby saving the resource of the data processing system. Thus, it is possible to improve the performance of the data processing system and the lifetime of the data storage device while maintaining the stability of the data processing system high.

Figure 13:
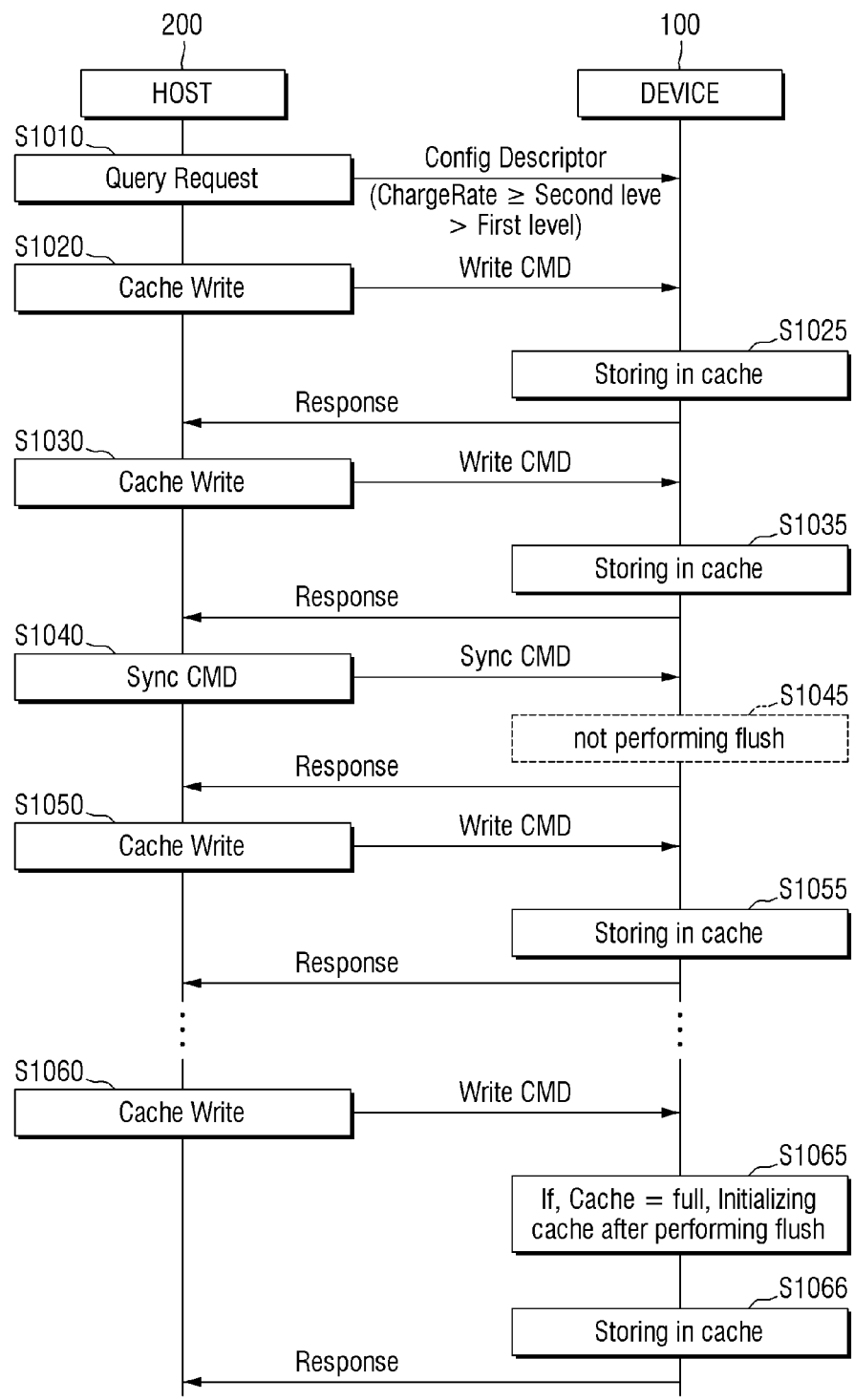
FIG. 13 is a flowchart for explaining the operation of a data processing system according to some embodiments.

FIG. 13 is a flowchart for explaining the operation of a data processing system according to some embodiments. For the convenience of explanation, the same contents as or similar contents to the aforementioned contents will be omitted or briefly described.

Referring to FIG. 13, in some example embodiments, when the charge rate of the battery 300 is a second level or more, which is higher than the aforementioned first level in FIG. 12, the data storage device 100 may not perform a flush operation or a force unit access operation regardless of whether or not the battery is charged, even when it receives a flush command (Flush CMD) or a write command (Write CMD) from the host 200.

In some example embodiments, the host 200 transmits battery information including the charge rate of the battery 300 to the data storage device 100 (S1010). In this case, the charge rate of the battery may be a second level or more, which is higher than the first level of FIG. 12.

The processes of steps S1020 to S1066 may be the same as the processes of steps S920 to S966 in FIG. 12.

Figure 14:
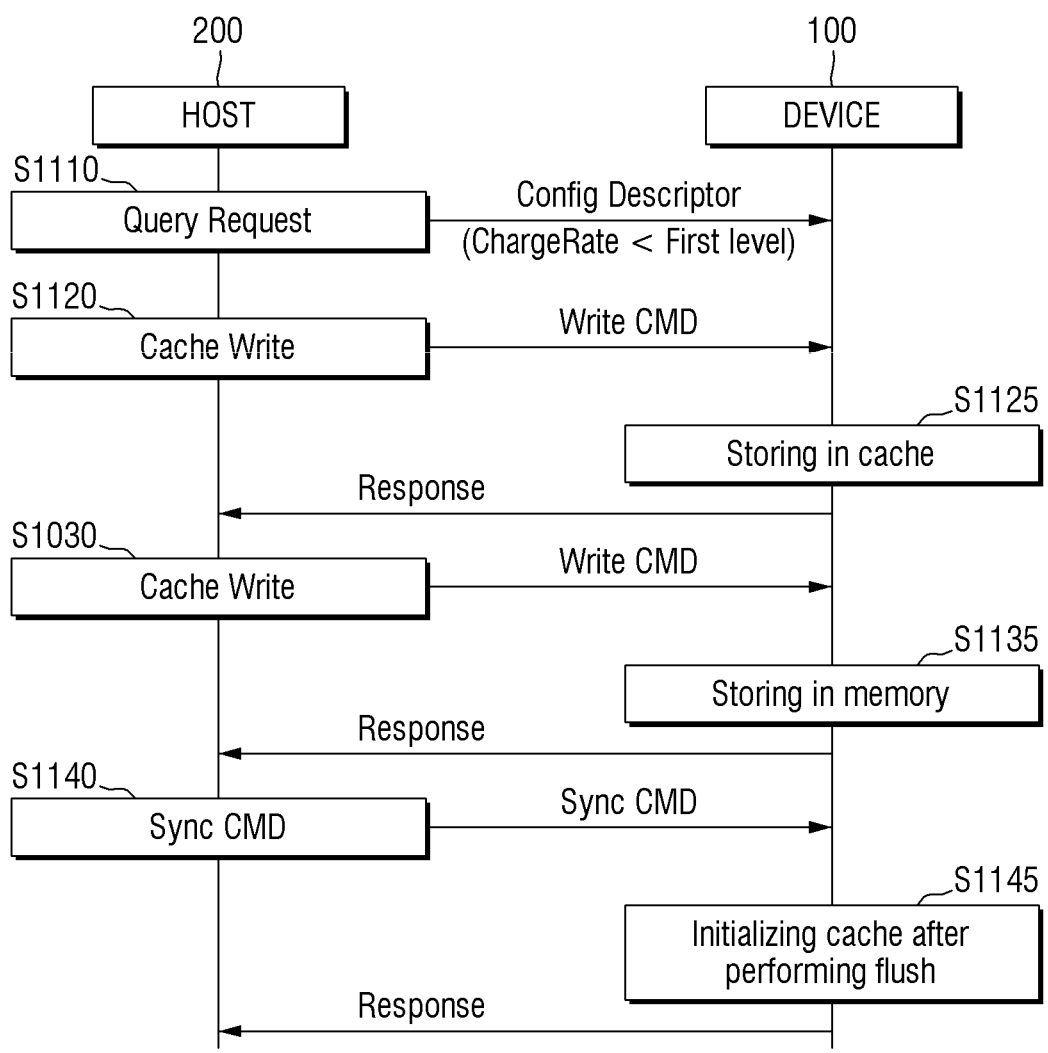
FIG. 14 is a flowchart for explaining the operation of a data processing system according to some embodiments.

FIG. 14 is a flowchart for explaining the operation of a data processing system according to some embodiments. For the convenience of explanation, the same contents as or similar contents to the aforementioned contents will be omitted or briefly described.

Referring to FIG. 14, in some example embodiments, when the charge rate of the battery 300 is less than the aforementioned first level in FIG. 12, the data storage device 100 may perform a flush operation or a force unit access operation regardless of whether or not the battery is charged, when it receives a flush command (Flush CMD) or a write command of data including force unit access (Write CMD (FUA)) from the host 200.

In some example embodiments, the host 200 transmits battery information including the charge rate of the battery 300 to the data storage device 100 (S1110). In this case, the charge rate of the battery may be less than the aforementioned first level in FIG. 12.

Subsequently, the host 200 transmits the write command (Write CMD) to the data storage device 100 (S1120). Thus, the data storage device 100 stores the data received from the host 200 in the cache 120. After the completion of the operation, the data storage device 100 transmits a response signal with respect to the completion of a work to the host 200 (S1125).

Subsequently, the host 200 transmits the write command (Write CMD) of data including force unit access to the data storage device 100 (S1130). Thus, the data storage device 100 stores the data including force unit access received from the host 200 in the memory 130. After the completion of the operation, the data storage device 100 transmits a response signal with respect to the completion of a work to the host 200 (S1135).

Subsequently, the host transmits the flush command (Flush CMD) to the data storage device 100 (S1140). Thus, the data storage device 100 stores the data stored in the cache 120 in the memory 130, and then initializes the cache 120 (S1145).

Figure 15:
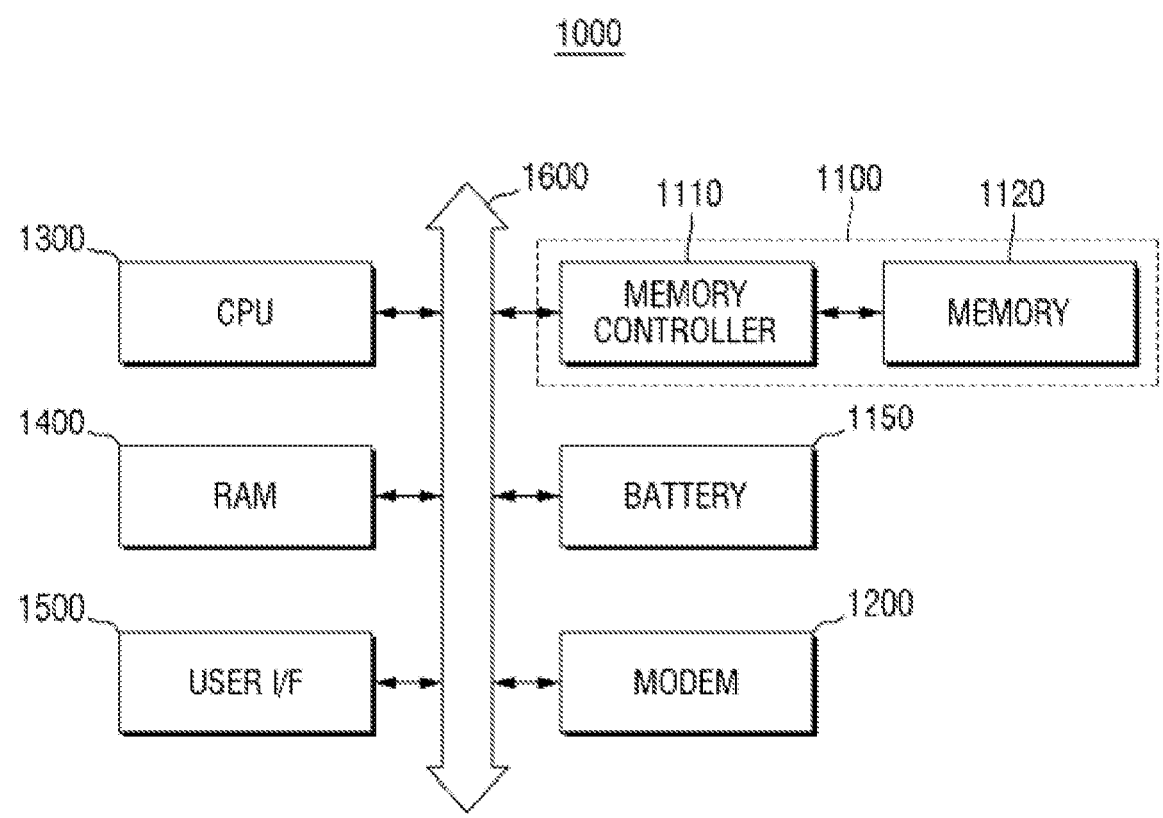
FIG. 15 is a block diagram showing a memory system including a data processing system according to an exemplary embodiment.

FIG. 15 is a block diagram showing a memory system including a data processing system according to an exemplary embodiment.

As shown in FIG. 15, the memory system 1000 may include a data processing system 1100, a battery 1150, a modem 1200, a central processing unit (CPU) 1300, a random access memory (RAM) 1400, a user interface 1500, and a system bus 1600. In this case, the data processing system 1100 of the memory system 1000 may be operated in the same manner as the aforementioned data processing system according to various exemplary embodiments.

The data processing system 1100 may include a memory controller 1110 and a memory 1120. The host 200 shown in FIG. 1 may be substantially the same as the memory controller 1110, and the data storage device 100 shown in FIG. 1 may be substantially the same as the memory 1120.

The battery 1150 may supply power to all the components of the memory system 1000. The battery 1150 may be a detachable battery configured to be detached from the memory system 1000 or a fixed battery that is not configured be detachable from the data processing system. In this case, the memory controller 1110 may transfer the detachability attribute of the battery 1150 to the memory 1120. Additionally, the memory controller 1110 may transfer the charge rate of the battery 1150 and the protection attribute of logical unit (LU) to the memory 1120.

The modem 1200 may exchange data with an external device in a wired or wireless manner to transfer the data to the data processing system 1100. The CPU 1300 may perform operations necessary for driving the memory system 1000. The RAM 1400 may provide resources necessary for driving the memory system 1000. The user interface 1500 may receive data from users.

The memory system 1000 may be configured to employ an SSD. In this case, the data processing system may process a large amount of data stably and reliably. However, the present disclosure is not limited thereto.

The data processing system 1100 may be mounted using various types of packages. For example, the memory controller 1110 and/or the memory 1120 may be mounted using packages, such as Package on Package (PoP), ball grid arrays (BGAs), chip scale packages (CSPs), Plastic Leaded Chip Carrier (PLCC), Plastic Dual In-Line Package (PUP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), and Wafer-Level Processed Stack Package (WSP). However, the present disclosure is not limited thereto.

Figure 16:
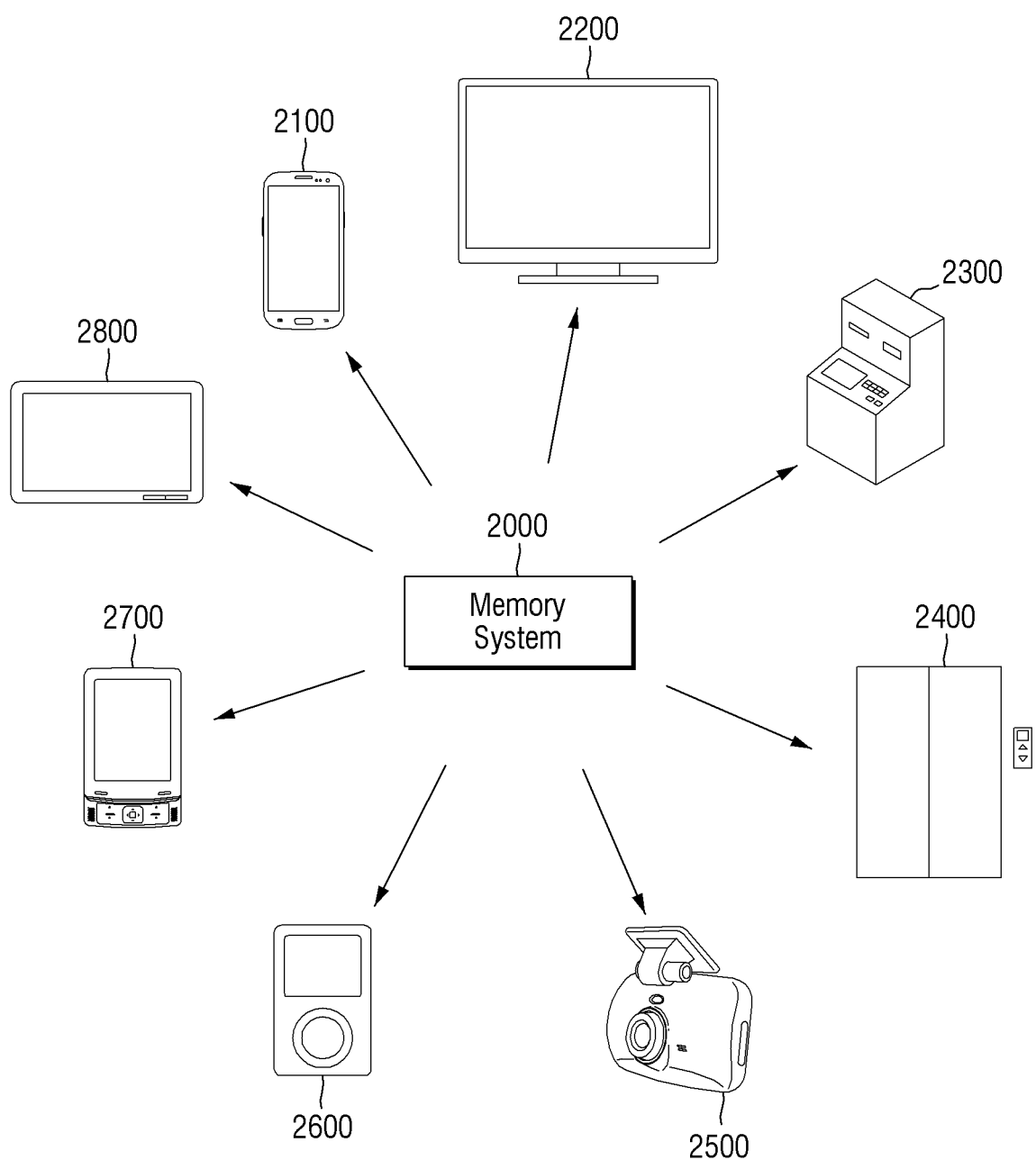
FIG. 16 is a view showing application examples of various electronic appliances mounted with a memory system including the data processing system according to an exemplary embodiment.

FIG. 16 is a view illustrating various exemplary applications for a memory system including the data processing system according to an exemplary embodiment.

As shown in FIG. 16, the memory system 2000 according to various exemplary embodiments may be employed in various electronic appliances. This memory system 2000 may be employed in various devices such as a mobile phone 2100, an automated teller machine (ATM) 2300, an elevator 2400, a dashboard camera 2500 used in automobiles and the like, a portable digital music player (e.g., an MP3 player) 2600, an e-book reader 2700, a global positioning system (GPS 2800, and the like.

The memory system 2000 may operate asynchronously with a processor of a system. Accordingly, it is possible to improve the function of an electronic appliance by reducing the driving load of the processor to allow the processor to operate at lower power and higher speed.

Figure 17:
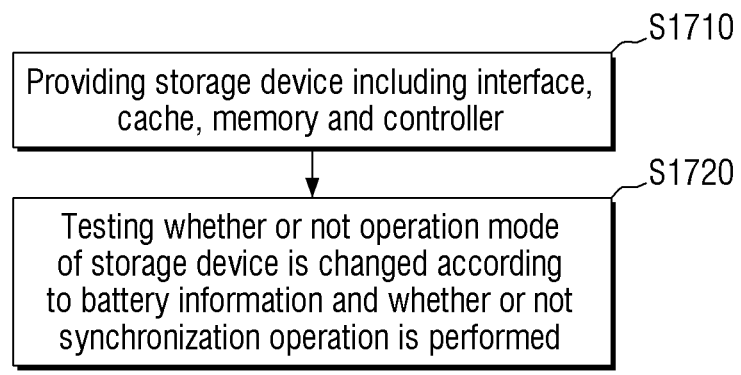
FIG. 17 is a schematic view for explaining a method of manufacturing a data storage device according to some embodiments.

FIG. 17 is a schematic view for explaining a method of manufacturing a data storage device according to some embodiments. For the convenience of explanation, duplicative contents will be briefly described or omitted.

Referring to FIG. 17, first, the data storage device 100 described in FIG. 2 is provided (S1710). Thereafter, the data storage device 100 tests whether or not the operation mode of the data storage device 100 is changed depending on battery information and whether or not the synchronization operation of the data storage device 100 is performed (S1720). For example, the controller 110 included in the data storage device 100 may test whether or not the operations described in FIGS. 3 to 14 are performed according to the charge rate of the battery 300, charging state information, and/or detachability attribute.

Although the various exemplary embodiments have been disclosed for illustrative purposes, those skilled in the art will appreciate that various modifications, additions and substitutions are possible, without departing from the scope and spirit of the present disclosure as disclosed in the accompanying claims.

What is claimed is:

1. A data storage device, comprising:
an interface receiving a command and data from a host;
a cache temporarily storing the received data;
a memory non-temporarily storing the data stored in the cache; and
a controller controlling the memory and the cache based on the command received from the host, wherein the command includes a charge rate of a battery supplying power to the data storage device, and
the controller determines whether or not the data storage device is in an idle state, and determines an active operation mode of the data storage device based on the charge rate of the battery, when the data storage device is the idle state,
wherein the controller determines the active operation mode of the data storage device as a first mode in which power consumption of the data storage device is minimized, when the charge rate of the battery is less than a first level, and
the controller determines the active operation mode of the data storage device as a second mode in which processing speed of the data storage device is maximized and which is different from the first mode, when the charge rate of the battery is the first level or more.

2. The data storage device of claim 1,
wherein, in the first mode, a first clock frequency of a first processor included in the interface and a second clock frequency of a second processor included in the controller are set to a predetermined minimum frequency.

3. The data storage device of claim 1,
wherein, in the first mode, inter processor communication (IPC) delay time between the interface and the controller is set to more than 0.

4. The data storage device of claim 1,
wherein, in the second mode, a first clock frequency of a first processor included in the interface and a second clock frequency of a second processor included in the controller are set to a predetermined maximum frequency.

5. The data storage device of claim 1,
wherein, in the second mode, inter processor communication (IPC) delay time between the interface and the controller is set to 0.

6. The data storage device of claim 1,
wherein the controller maintains a current active operation mode, when the data storage device is an active state.

7. A data storage device, comprising:
an interface receiving a command and data from a host;
a cache temporarily storing the received data;
a memory non-temporarily storing the data stored in the cache; and
a controller controlling the memory and the cache based on the command received from the host,
wherein the command includes charge rate and charging state information of a battery supplying a power to the data storage device, and
the controller determines whether or not to perform a synchronization operation based on the charge rate and charging state information of the battery, when receiving a synchronization command from the host,
wherein the synchronization command includes a flush command,
when the charge rate of the battery is a first level or more and the charging state information indicates that the battery is being charged, the controller does not perform a flush operation for the data stored in the cache when receiving the flush command from the host, and
when the charge rate of the battery is less than the first level, the controller performs the flush operation for the data stored in the cache regardless of the charging state information when receiving the flush command from the host.

8. The data storage device of claim 7,
wherein, when the charge rate of the battery is a second level, higher than the first level, or more, the controller does not perform the flush operation for the data stored in the cache regardless of the charging state information when receiving the flush command from the host.

9. The data storage device of claim 7,
wherein, when the cache does not have a space for storing the data received from the host, the controller performs the flush operation for the data stored in the cache, and initializes the cache.

10. The data storage device of claim 7,
wherein the synchronization command includes a write command of data including force unit access,
when the charge rate of the battery is the first level or more and the charging state information indicates that the battery is being charged, the controller stores the data including the force unit access in the cache when receiving the write command of the data including the force unit access from the host, and
when the charge rate of the battery is less than the first level, the controller stores the data including the force unit access in the memory regardless of the charging state information when receiving the write command of the data including the force unit access from the host.

11. The data storage device of claim 10,
wherein, when the charge rate of the battery is a second level, higher than the first level, or more, the controller stores the data including the force unit access in the cache regardless of the charging state information when receiving the write command of the data including the force unit access from the host.

12. The data storage device of claim 10,
wherein, when the cache does not have a space for storing the data received from the host, the controller performs the flush operation for the data stored in the cache, and initializes the cache.

13. A method of manufacturing a data storage device, comprising:
providing the data storage device including an interface externally receiving a command and data, a cache temporarily storing the received data, a memory non-temporarily storing the data stored in the cache, and a controller controlling the memory and the cache based on the command; and
testing the data storage device,
wherein the command includes a charge rate and charging state information of a battery supplying a power to the data storage device, and
the testing the data storage device includes testing whether or not the controller included in the data storage device determines an active operation mode of the data storage device based on the charge rate and charging state information of the battery, and whether or not the data storage device performs a synchronization operation, wherein, in the determining the active operation mode of the data storage device, the controller determines whether or not the data storage device is an idle state, and determines the active operation mode of the data storage device when the data storage device is the idle state, the controller determines the active operation mode of the data storage device as a first mode in which power consumption of the data storage device is minimized, when the charge rate of the battery is less than a first level, and the controller determines the active operation mode of the data storage device as a second mode in which processing speed of the data storage device is maximized and which is different from the first mode, regardless of the charging state information of the battery, when the charge rate of the battery is the first level or more.

14. The method of claim 13, wherein the controller maintains a current active operation mode of an active state when the data storage device is the active state.

15. The method of claim 13, wherein, in the determining whether or not performing the synchronization operation, a synchronization command includes a flush command, when the charge rate of the battery is the first level or more and the charging state information indicates that the battery is being charged, the controller does not perform a flush operation for the data stored in the cache when receiving the flush command, and when the charge rate of the battery is less than the first level, the controller performs the flush operation for the data stored in the cache regardless of the charging state information when receiving the flush command.

16. The method of claim 15, wherein, when the cache does not have a space for storing the data externally received, the controller performs the flush operation for the data stored in the cache, and initializes the cache.

17. The method of claim 13, wherein, in the determining whether or not performing the synchronization operation, a synchronization command includes a write command of data including force unit access, when the charge rate of the battery is the first level or more and the charging state information indicates that the battery is being charged, the controller stores the data including the force unit access in the cache when receiving the write command of the data including the force unit access, and when the charge rate of the battery is less than the first level, the controller stores the data including the force unit access in the memory regardless of the charging state information when receiving the write command of the data including the force unit access.

* * * * *